United States Patent
Wu et al.

(10) Patent No.: US 9,445,352 B2
(45) Date of Patent: Sep. 13, 2016

(54) POWER EFFICIENT DISCOVERY OF LTE-DIRECT RELAY FOR OUT-OF-COVERAGE DEVICES

(71) Applicant: QUALCOMM Incorporated, San Diego, CA (US)

(72) Inventors: Zhibin Wu, Bedminster, NJ (US); Vincent D. Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/954,397

(22) Filed: Jul. 30, 2013

(65) Prior Publication Data

US 2015/0038136 A1     Feb. 5, 2015

(51) Int. Cl.
*H04W 48/08*     (2009.01)
*H04W 88/04*     (2009.01)

(52) U.S. Cl.
CPC ............. *H04W 48/08* (2013.01); *H04W 88/04* (2013.01); *Y02B 60/50* (2013.01)

(58) Field of Classification Search
CPC ............................. H04W 48/08; H04W 88/04
See application file for complete search history.

(56) References Cited

U.S. PATENT DOCUMENTS

| | | |
|---|---|---|
| 8,068,454 B2 | 11/2011 | Bonta et al. |
| 2004/0063451 A1 | 4/2004 | Bonta et al. |
| 2011/0010340 A1* | 1/2011 | Hung .................. H04L 12/1886 707/623 |
| 2012/0005304 A1* | 1/2012 | Guo .................... H04L 12/1836 709/217 |
| 2012/0158991 A1 | 6/2012 | Ajjaguttu et al. |
| 2012/0185583 A1 | 7/2012 | Wu et al. |
| 2012/0309358 A1 | 12/2012 | Gunawardena et al. |
| 2013/0034052 A1 | 2/2013 | Saito |
| 2013/0083722 A1* | 4/2013 | Bhargava ............ H04W 72/085 370/315 |
| 2014/0133332 A1* | 5/2014 | Lee ....................... H04W 88/04 370/252 |

FOREIGN PATENT DOCUMENTS

| | | |
|---|---|---|
| EP | 2282604 A1 | 2/2011 |
| WO | WO-2010051828 A1 | 5/2010 |

OTHER PUBLICATIONS

Ericsson, "Explicit Out of Coverage Reporting Mechanism in E-UTRAN," 3GPP TSG-RAN WG1 Meeting #50, Athens, Greece, Aug. 20-24, 2007, R1-073747, 5 pgs., downloaded from http://www.3gpp.org/ftp/tsg_ran/wg1_rl1/TSGR1_50/Docs/, 3rd Generation Partnership Project.

ISA/EPO, International Search Report and Written Opinion of the International Searching Authority, Int'l App. No. PCT/US2014/047597, Nov. 11, 2014, European Patent Office, Rijswijk, NL, 15 pgs.

Qualcomm Incorporated, "ProSe UE-to-Network Relays," SA WG2 Meeting #98, Valencia, Spain, Jul. 15-19, 2013, S2-132455, SA WG2 Temporary Document, pp. 1-9, downloaded from http://www.3gpp.org/ftp/tsg_sa/wg2_arch/TSGS2_75E_Elbonia/INBOX/, ProSe/GCSE/Rel-12, 3rd Generation Partnership Project.

IPEA/EPO, Second Written Opinion of the International Preliminary Examining Authority, Int'l App. No. PCT/US2014/047597, Nov. 9, 2015, European Patent Office, Munich, DE, 14 pgs.

\* cited by examiner

*Primary Examiner* — Chuong A Ngo
(74) *Attorney, Agent, or Firm* — Holland & Hart LLP

(57) ABSTRACT

Methods, systems, and devices are described for managing wireless communications. In one method, a mobile device may determine to transition to a relay status. The relay status may indicate a capability of the mobile device to function as a relay device between at least one other mobile device and a base station. A peer discovery signal that indicates the relay status may then be transmitted. In another method, a mobile device may broadcast an out-of-coverage status indicator in a first peer discovery signal. A second peer discovery signal may be received from at least one other mobile device. The second peer discovery signal may indicate a capability of the at least one other mobile device to function as a relay device.

45 Claims, 13 Drawing Sheets

POWER EFFICIENT DISCOVERY OF LTE-DIRECT RELAY FOR OUT-OF-COVERAGE DEVICES

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. When a mobile device moves outside the coverage area of a base station, it may lose service via the wireless communications system with which the base station is associated.

SUMMARY

The described features generally relate to one or more improved methods, systems, and/or apparatuses for managing wireless communications.

A first method for managing wireless communications is described. In one configuration, a mobile device may determine to transition to a relay status. The relay status may indicate a capability of the mobile device to function as a relay device between at least one other mobile device and a base station. A peer discovery signal that indicates the relay status may then be transmitted.

In some embodiments of the method, it may be determined whether an available operating power of the mobile device exceeds a threshold. Upon determining that the available operating power of the mobile device exceeds the threshold, it may be determined to transition to the relay status.

It some embodiments of the method, it may be determined whether an available transmission bandwidth of the mobile device exceeds a threshold. Upon determining that the available transmission bandwidth of the mobile device exceeds the threshold, it may be determined to transition to the relay status.

In some embodiments of the method, an out-of-coverage status indicator or a request for relaying service may be received from one of the at least one other mobile device. In some cases, a direct link may be established with the one of the at least one other mobile device. In other cases, it may be determined whether a service required by the one of the at least one other mobile device is provided by the base station, and upon determining that the service required by the one of the at least one other mobile device is provided by the base station, a direct link may be established with the one of the at least one other mobile device.

In some embodiments of the method, a transmission may be received from the base station, and the transmission may be retransmitted to one of the at least one other mobile device.

In some embodiments of the method, a transmission may be received from one of the at least one other mobile device, and the transmission may be retransmitted to the base station.

In some embodiments, data may be received from the base station, and the data may be retransmitted to one of the at least one other mobile device.

In some embodiments, the method may include operating in a coverage area of the base station, while the at least one other mobile device operates out of the coverage area of the base station.

A mobile device for managing wireless communications is also described. In one configuration, the mobile device may include a means for determining to transition to a relay status, and a means for transmitting a peer discovery signal that indicates the relay status. The relay status may indicate a capability of the mobile device to function as a relay device between at least one other mobile device and a base station.

Another mobile device for managing wireless communications is also described. In one configuration, the mobile device may include a processor, a memory in electronic communication with the processor, and instructions stored in the memory. The instructions may be executable by the processor to determine to transition to a relay status, and to transmit a peer discovery signal that indicates the relay status. The relay status may indicate a capability of the mobile device to function as a relay device between at least one other mobile device and a base station.

A computer program product for managing wireless communications is also described. In one configuration, the computer program product may include a non-transitory computer-readable medium storing instructions executable by a processor to determine to transition to a relay status, and to transmit a peer discovery signal that indicates the relay status. The relay status my indicate a capability of the mobile device to function as a relay device between at least one other mobile device and a base station.

A second method for managing wireless communications is described. In one configuration, a mobile device may broadcast an out-of-coverage status indicator in a first peer discovery signal. A second peer discovery signal may be received from at least one other mobile device. The second peer discovery signal may indicate a capability of the at least one other mobile device to function as a relay device.

In some embodiments of the method, a direct link may be established with one of the at least one other mobile device.

In some embodiments of the method, it may be determined whether a signal strength of a communication with one of the at least one other mobile device exceeds a threshold, and upon determining that the signal strength of the communication with one of the at least one other mobile device exceeds the threshold, a direct link may be established with the one of the at least one other mobile device.

In some embodiments of the method, it may be determined whether a signal strength of a communication with each of the at least one other mobile device exceeds a threshold; and upon determining that the signal strength of the communication with the one of the at least one other mobile device exceeds the threshold, a direct link may be established with one of the at least one other mobile device.

In some embodiments of the method, the out-of-coverage status indicator may be broadcast in the first peer discovery signal prior to operating outside of a coverage area of a base station.

In some embodiments of the method, the out-of-coverage status indicator may be broadcast in the first peer discovery signal subsequent to operating outside of a coverage area of a base station.

In some embodiments of the method, the mobile device may determine to transition to a relay status. The relay status may indicate a capability of the mobile device to function as a relay device between the at least one other mobile device and at least one out-of-coverage mobile device operating out of the coverage area of a base station. The method may further include transmitting a third peer discovery signal that indicates the relay status.

In some embodiments of the method, an out-of-coverage status indicator or a request for relaying service from one of the at least one out-of-coverage mobile device may be received, and a direct link may be established with the one of the at least one out-of-coverage mobile device. In some cases, data from one of the at least one other mobile device may be received, and the data may be retransmitted to one of the at least one out-of-coverage mobile device. In some cases, data from one of the at least one out-of-coverage mobile device may be received, and the data may be retransmitted to one of the at least one other mobile device.

A mobile device for managing wireless communications is also described. In one configuration, the mobile device may include a means for broadcasting an out-of-coverage status indicator in a first peer discovery signal, and a means for receiving a second peer discovery signal from at least one other mobile device. The second peer discovery signal may indicate a capability of the at least one other mobile device to function as a relay device.

Another mobile device for managing wireless communications is also described. In one configuration, the mobile device may include a processor, a memory in electronic communication with the processor, and instructions stored in the memory. The instructions may be executable by the processor to broadcast an out-of-coverage status indicator in a first peer discovery signal and receive a second peer discovery signal from at least one other mobile device. The second peer discovery signal may indicate a capability of the at least one other mobile device to function as a relay device.

A computer program product for managing wireless communications is also described. In one configuration, the computer program product may include a non-transitory computer-readable medium storing instructions executable by a processor to broadcast, via a mobile device, an out-of-coverage status indicator in a first peer discovery signal, and receive a second peer discovery signal from at least one other mobile device. The second peer discovery signal may indicate a capability of the at least one other mobile device to function as a relay device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A base station of a wireless communications system is associated with a coverage area. When a mobile device moves outside the coverage area of a base station, it may lose service via the wireless communications system with which the base station is associated. To mitigate the chance of service loss, the mobile device may broadcast an out-of-coverage status indicator in a peer discovery message. An in-coverage mobile device that receives the out-of-coverage status indicator may then determine whether it is capable of providing relay services (i.e., functioning as a relay device) for the out-of-coverage mobile device. Alternately, an in-coverage mobile device may proactively transition to a relay status and transmit (e.g., broadcast) a peer discovery signal that indicates its relay status. An out-of-coverage mobile device that receives the peer discovery signal of the in-coverage mobile device may then transmit a relay request to the in-coverage mobile device. In some cases, the peer discovery signals may be Long Term Evolution (LTE) Direct Peer-Discovery Signals.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
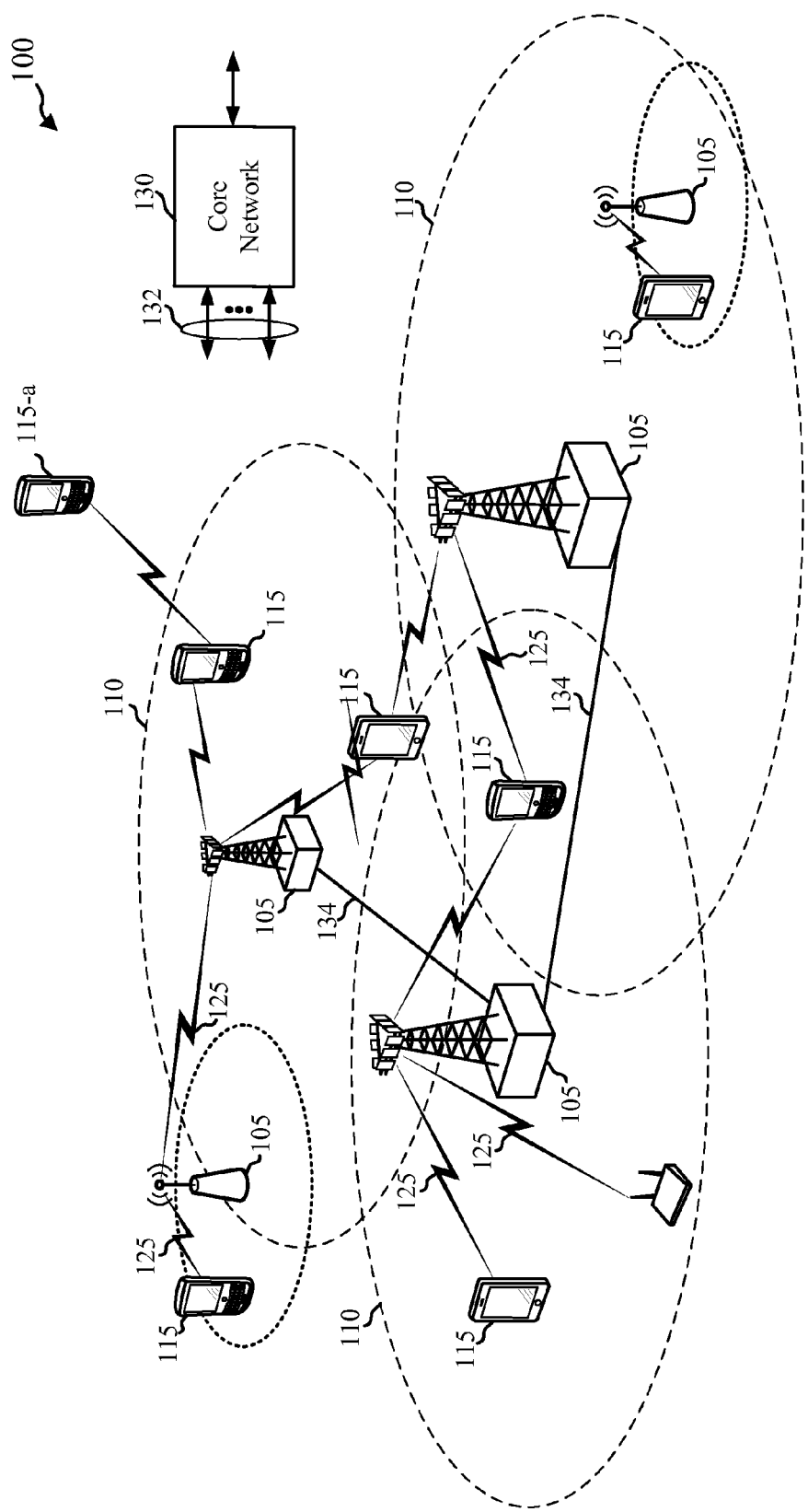
FIG. 1 is a block diagram of an example of a wireless communications system.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via backhaul links 132 (e.g., S1, etc.). The eNBs 105 may also communicate with one another, e.g., directly or indirectly via backhaul links 134 (e.g., ×2, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one embodiment, a UE 115 within a coverage area of a base station 105 may serve as a relay for a UE 115-a that is outside the coverage area of the base station 105. The in-coverage UE 115 may relay (or retransmit) communications from the base station 105 to the out-of-coverage UE 115-a. Similarly, the in-coverage UE 115 may relay communications from the out-of-coverage UE 115-a to the base station 105.

The communication links 125 shown in wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Figure 2:
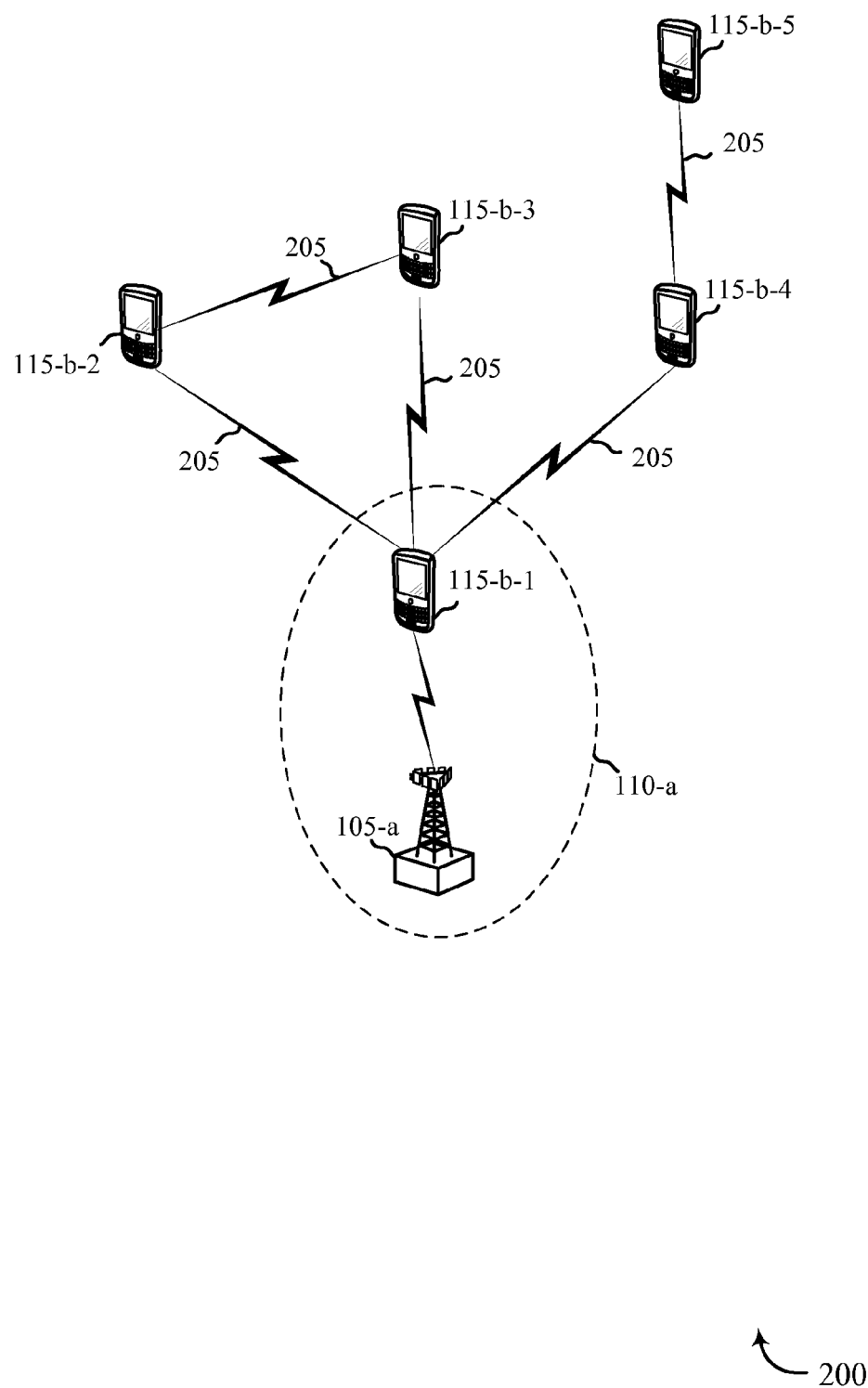
FIG. 2 is a block diagram of an example of an environment in which wireless communications may be managed in accordance with various embodiments.

FIG. 2 is a block diagram of an example of an environment 200 in which the present systems and methods may be implemented. In one configuration, a base station 105-a may communicate with one or more devices that fall within a coverage area 110-a of the base station 105-a. In one example, an in-coverage mobile device 115-b-1 may receive/transmit communications from/to the base station 105-a. One or more mobile devices 115b-2, 115b-3, 115b-4, 115b-5 may be outside of the coverage area 110-a of the base station 105a. The base station 105a and the mobile devices 115b may be examples of the base stations 105 and mobile devices 115 described with reference to FIG. 1.

In one embodiment, the in-coverage mobile device 115b-1 may broadcast, multi-cast, or unicast a peer discovery signal 205. The signal 205 may be sent to one or more out-of-coverage UEs. The peer discovery signal 205 may be a Long Term Evolution (LTE) Direct Peer-Discovery Signal. In one configuration, the signal 205 may include an identifier of the in-coverage mobile device 115b-1. For example, the identifier may be a media access control (MAC) address of the in-coverage mobile device 115b-1. In addition, the peer discovery signal 205 may include a relay status of the mobile device 115b-1. The relay status may indicate whether the in-coverage mobile device 115b-1 is capable of providing relay services for one or more out-of-coverage mobile devices 115.

In one example, an out-of-coverage mobile device may receive peer discovery signals indicating that each of one or more in-coverage mobile devices is capable of functioning as a relay device. The out-of-coverage mobile device may then select one of the in-coverage mobile devices to provide relay services. The determination as to which in-coverage mobile device to select may be based on a signal strength of the peer discovery signals received from each in-coverage mobile device, the identities of the in-coverage mobile devices, and/or various other factors (e.g., the remaining battery life of each in-coverage mobile device (if operating on batteries), the type(s) of service(s) supported by each in-coverage mobile device (if the relay devices are selective about which services or applications they can or are willing to provide relay service for), and/or the radio technology(ies) for which each in-coverage mobile device is willing to provide relay service. Some or all of these factors may be indicated or derived from peer discovery signals. Some of the factors may also or alternately be obtained by querying the in-coverage mobile device(s) from which the out-of-coverage mobile device received relay status and identifier information.

In one configuration, an out-of-coverage mobile device may transmit a peer discovery signal 205 to one or more in-coverage mobile devices 115b-1. The peer discovery signal may indicate that the out-of-coverage mobile device is out-of-coverage or requesting relay services. The signal may include an identifier of the out-of-coverage mobile device. In one configuration, a mobile device may broadcast a peer discovery signal 205 when it senses that it is about to be out of the coverage area 110-a of the base station 105a. In another embodiment, a mobile device may broadcast the signal 205 after it is already out of the coverage area 110-a.

In one example, out-of-coverage mobile devices 115b-2, 115b-3, may communicate with each other. For example, the mobile devices 115b-2, 115b-3 may establish a direct peer-to-peer connection. The in-coverage mobile device 115b-1 may also provide relay services to one or more out-of-coverage mobile devices. In one configuration, a first out-of-coverage mobile device 115b-4 may serve as a relay device for a second out-of-coverage mobile device 115b-5. The first out-of-coverage mobile device 115b-4 may transmit a peer discovery signal 205 to inform the second out-of-coverage mobile device 115b-5 that it (115b-4) is capable of providing relay services. As another example, the second out-of-coverage mobile device 115b-5 may transmit a signal 205 requesting relay services from the first out-of-coverage mobile device 115b-4. As a result, the in-coverage mobile device 115b-1 may relay communications to/from the base station 105a from/to the first out-of-coverage UE 115b-4. The first out-of-coverage mobile device 115b-4 may relay at least a part of the communications from/to the second out-of-coverage mobile device 115b-5.

Figure 3A:
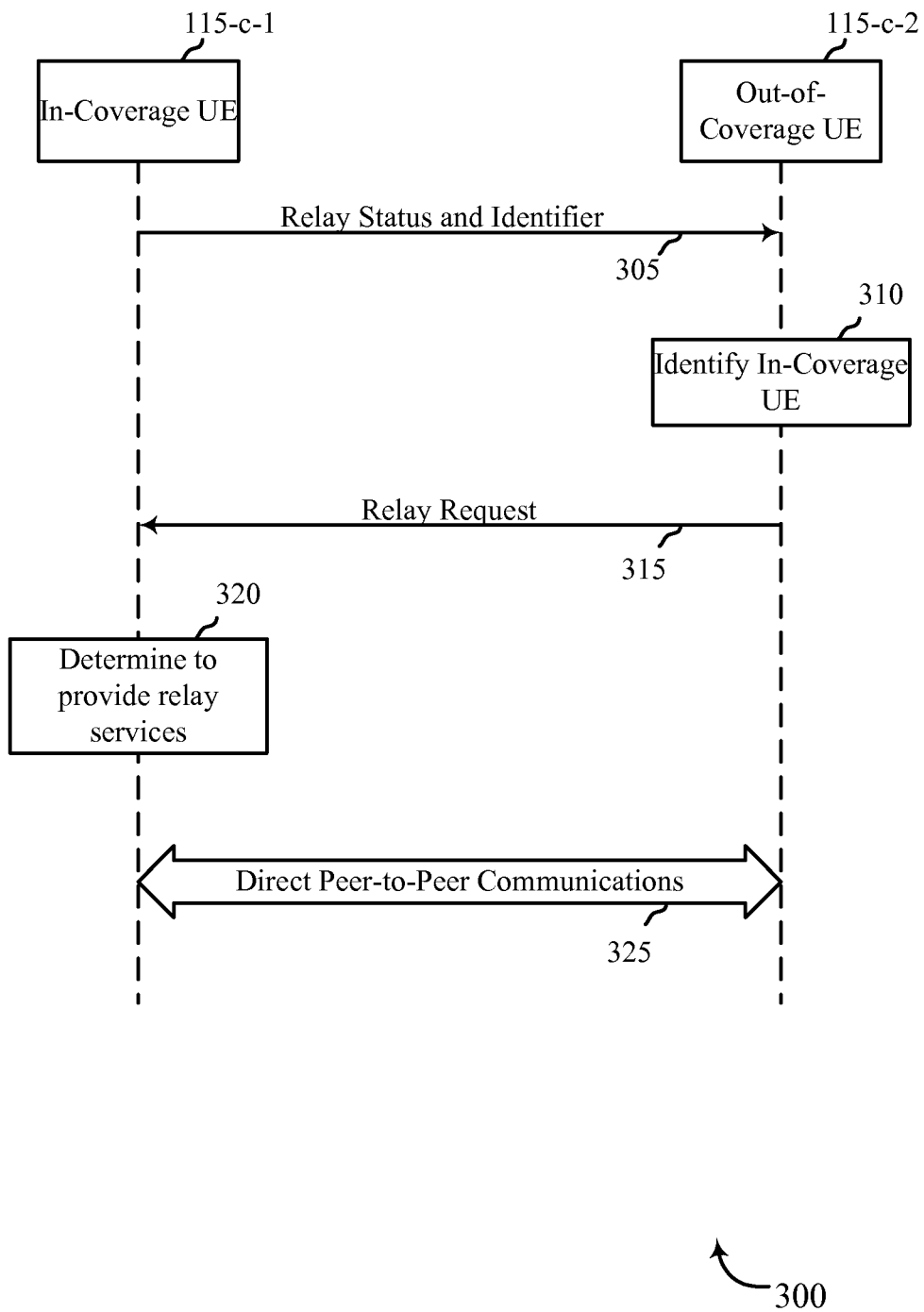
FIGS. 3A and 3B are message flow diagrams illustrating embodiments of communications between a mobile device operating in a coverage area of a base station and a mobile device operating out of the coverage area of the base station, in accordance with various embodiments.

FIG. 3A is a message flow diagram 300 illustrating an embodiment of communications between an in-coverage mobile device 115-c-1 and an out-of-coverage mobile device 115-c-2. The mobile devices 115-c may be examples of the mobile devices described in FIGS. 1 and/or 2.

In one configuration, the in-coverage mobile device 115-c-1 may transmit relay status and identifier information 305 to the out-of-coverage mobile device 115-c-2. The relay status may indicate whether the in-coverage mobile device 115-c-1 is capable of providing relay services. In one embodiment, the relay status may indicate whether the in-coverage mobile device 115-c-1 has LTE-Direct capabilities to provide the relay services. The identifier may be information that serves to identify the in-coverage mobile device 115-c-1. The relay status and identifier may be transmitted via a peer discovery channel, such as an LTE-Direct Peer Discovery Channel.

The out-of-coverage mobile device 115-c-2 may analyze the identifier to identify the in-coverage mobile device 310. If the out-of-coverage mobile device 115-c-2 receives more than one identifier, from different in-coverage mobile devices that indicate they are available to provide relay services, the out-of-coverage mobile device 115-c-2 may select one of the in-coverage mobile devices for providing relay service. In some cases, the selection may be based on factors such as the identities of the in-coverage mobile devices, the remaining battery life of each in-coverage mobile device, the type(s) of service(s) supported by each in-coverage mobile device, and/or the radio technology(ies) for which each in-coverage mobile device is willing to provide relay service. Some or all of these factors may be indicated or derived from peer discovery signals. Some of the factors may also or alternately be obtained by querying the in-coverage mobile device(s) from which the out-of-coverage mobile device 115-c-2 received relay status and identifier information.

The out-of-coverage mobile device 115-c-2 may transmit a relay request 315 to the in-coverage mobile device 115-c-1. The relay request 315 may in some cases be transmitted via the peer discovery channel. Upon receiving the request 315, the in-coverage mobile device 115-c-1 may determine whether to provide relay services to this particular out-of-coverage mobile device 115-c-2. This determination may be based on the available battery power of the in-coverage mobile device 115-c-1, the strength of the signal of the relay request, whether the in-coverage mobile device 115-c-1 is already providing relay services to another out-of-coverage mobile device, the type of relay services requested by the out-of-coverage mobile device 115-c-2, etc. If the in-coverage mobile device 115-c-1 determines to provide the relay services, direct peer-to-peer communications 325 may be established between the in-coverage mobile device 115-c-1 and the out-of-coverage mobile device 115-c-2.

The in-coverage mobile device 115-c-1 may retransmit communications to a base station that are received directly from the out-of-coverage mobile device 115-c-2. The in-coverage mobile device 115-c-1 may also relay communication to the out-of-coverage mobile device 115-c-2 that are received from the base station. In one configuration, the in-coverage mobile device 115-c-1 may forward communications to other out-of-coverage mobile devices that are directly received from the out-of-coverage mobile devices 115-c-2. These other out-of-coverage mobile devices may still be within range of the in-coverage mobile device 115-c-1 to receive communications. The in-coverage mobile device 115-c-1 may also retransmit communications received from the out-of-coverage mobile device 115-c-2 to other in-coverage mobile devices.

Figure 3B:
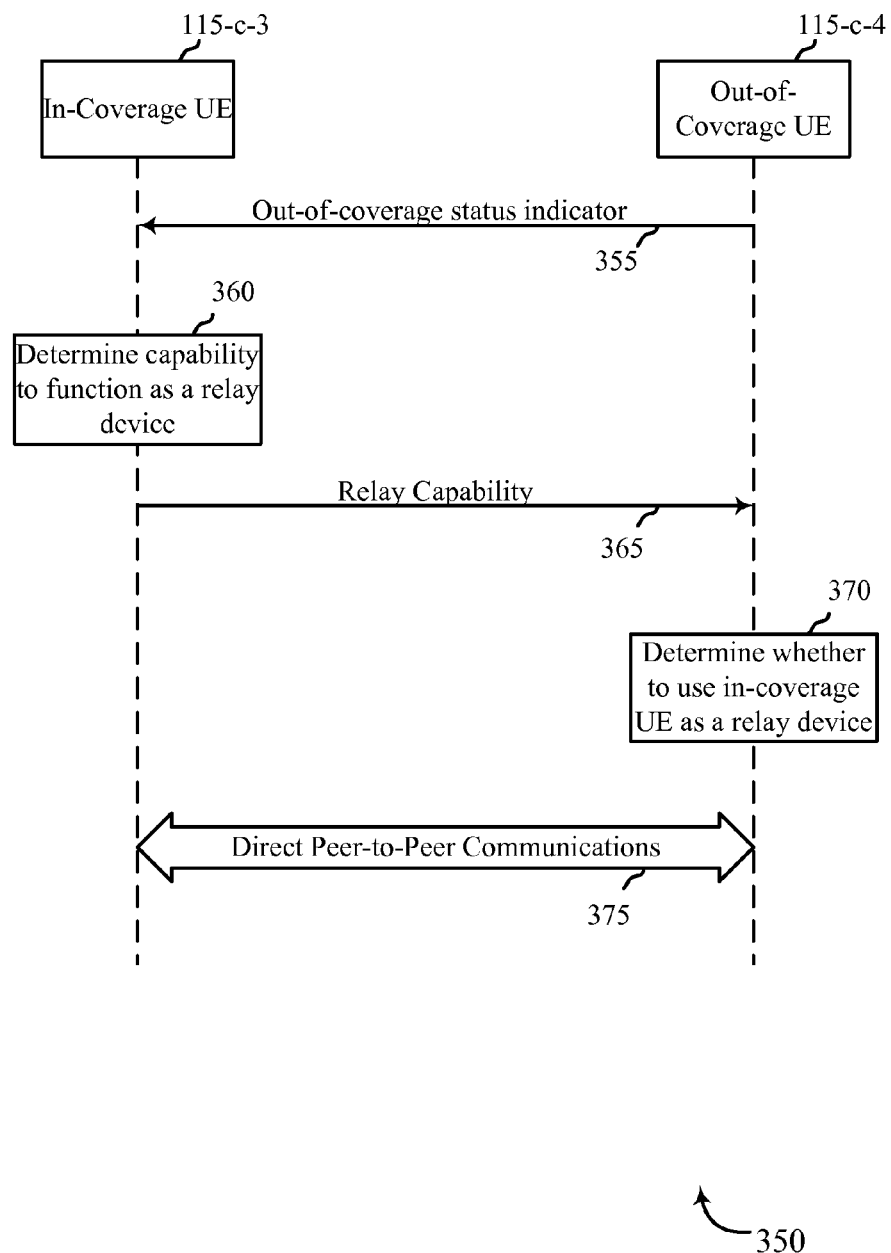

FIG. 3B is a message flow diagram 350 illustrating another embodiment of communications between an in-coverage mobile device 115-c-3 and an out-of-coverage mobile device 115-c-4. The mobile devices 115-c may be examples of the mobile devices described in FIGS. 1 and/or 2.

In one configuration, the out-of-coverage mobile device 115-c-3 may transmit an out-of-coverage status indicator 355 to the in-coverage mobile device 115-c-3. The out-of-coverage status indicator 355 may indicate a need of the out-of-coverage mobile device 115-c-4 for relay service to a base station, and in some cases may indicate a type of service or type of relay service needed by the out-of-coverage mobile device 115-c-4. The out-of-coverage status indicator 355 may be transmitted via a peer discovery channel, such as an LTE-Direct Peer Discovery Channel.

Upon receiving the out-of-coverage status indicator 355, the in-coverage mobile device 115-c-3 may determine its capability to function as a relay device at block 360. This determination may be based on the available battery power of the in-coverage mobile device 115-c-3, the strength of the signal of the relay request, whether the in-coverage mobile device 115-c-3 is already providing relay services to another out-of-coverage mobile device, the type of relay services requested by the out-of-coverage mobile device 115-c-4, etc. When the in-coverage mobile device 115-c-3 is capable of functioning as a relay device, the in-coverage device 115-c-3 may transmit a signal 365 indicating its capability to provide relay services to the out-of-coverage mobile device 115-c-4. The relay capability signal 365 may also be transmitted via the peer discovery channel.

At block 370, the out-of-coverage mobile device 115-c-4 may determine whether to use the in-coverage mobile device 115-c-3 as a relay device. If the out-of-coverage mobile device 115-c-4 receives signals indicating that more than one in-coverage mobile device is capable of providing relay service, the out-of-coverage mobile device 115-c-4 may select one of the in-coverage mobile devices for providing relay service. In some cases, the selection may be based on factors such as the identities of the in-coverage mobile devices, the remaining battery life of each in-coverage mobile device, the type(s) of service(s) supported by each in-coverage mobile device, and/or the radio technology(ies) for which each in-coverage mobile device is willing to provide relay service. Some or all of these factors may be indicated or derived from peer discovery signals such as the signal 365. Some of the factors may also or alternately be obtained by querying the in-coverage mobile device(s) from which the out-of-coverage mobile device 115-c-4 received relay capability signals.

If the out-of-coverage mobile device 115-c-4 decides to obtain relay services from the in-coverage mobile device 115-c-3, direct peer-to-peer communications 375 may be established between the in-coverage mobile device 115-c-3 and the out-of-coverage mobile device 115-c-4.

The in-coverage mobile device 115-c-3 may retransmit communications to a base station that are received directly from the out-of-coverage mobile device 115-c-4. The in-coverage mobile device 115-c-3 may also relay communications to the out-of-coverage mobile device 115-c-4 that are received from the base station.

Figure 4:
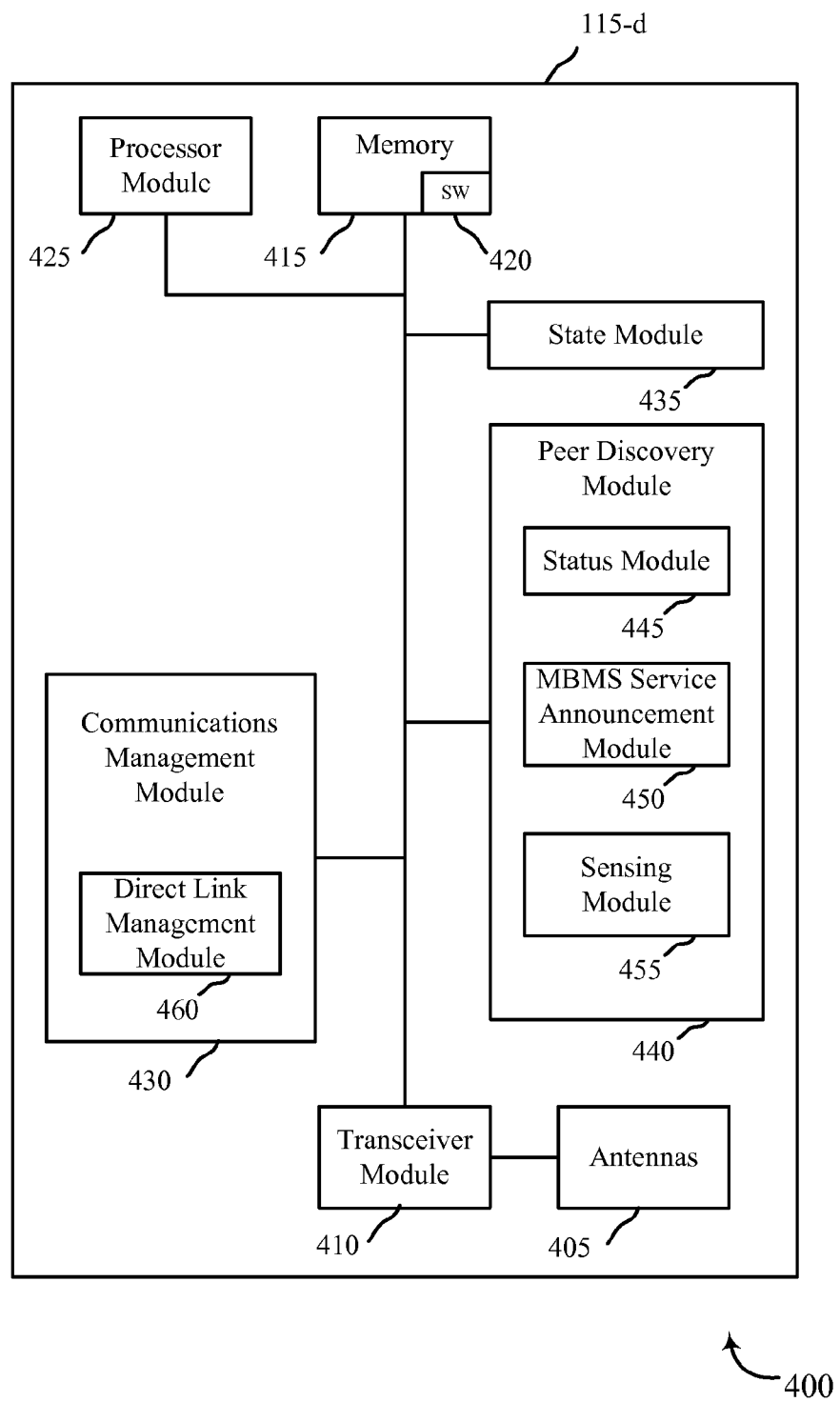
FIG. 4 is a block diagram of an example of a mobile device in accordance with various embodiments.

FIG. 4 is an example of a block diagram 400 of a mobile device 115-d. This may be the mobile device 115 of FIGS. 1, 2, 3A, and/or 3B. The mobile device 115-d may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-d may have an internal power supply (not shown), such as a small battery, to facilitate mobile operation.

The mobile device 115-d may include antennas 405, a transceiver module 410, memory 415, and a processor module 425, which each may be in communication, directly or indirectly, with each other (e.g., via one or more buses). The transceiver module 410 may be configured to communicate bi-directionally, via the antennas 405 and/or one or more wired or wireless links, with one or more networks, as described above. For example, the transceiver module 410 may be configured to communicate bi-directionally with one or more of the base stations 105 of FIGS. 1, 2, and/or 3. The transceiver module 410 may also be configured to communicate with one or more other mobile devices 115, either as a relay for the one or more other mobile devices 115, or as a device in need of relaying services from one or more other mobile devices 115. The transceiver module 410 may include a modem configured to modulate packets and provide the modulated packets to the antennas 405 for transmission, and to demodulate packets received from the antennas 405. While the mobile device 115-d may include a single antenna, the mobile device 115-d will typically include multiple antennas 405 for multiple links.

The memory 415 may include random access memory (RAM) and read-only memory (ROM). The memory 415 may store computer-readable, computer-executable software code 420 containing instructions that are configured to, when executed, cause the processor module 425 to perform various functions (e.g., call processing, database management, message routing, etc.). Alternatively, the software code 420 may not be directly executable by the processor module 425, but may be configured to cause the mobile device 115-d (e.g., when compiled and executed) to perform various of the functions described herein.

The processor module 425 may include an intelligent hardware device, e.g., a central processing unit (CPU), a microcontroller, an application specific integrated circuit (ASIC), etc. The processor module 425 may include a speech encoder (not shown) configured to receive audio via a microphone, convert the audio into packets (e.g., 30 ms in length) representative of the received audio, provide the audio packets to the transceiver module 410, and provide indications of whether a user is speaking. Alternatively, an encoder may only provide packets to the transceiver module 410, with the provision or withholding/suppression of the packet itself providing the indication of whether a user is speaking.

According to the architecture of FIG. 4, the mobile device 115-d may further include a communications management module 430, a state module 435, and a peer discovery module 440. The communications management module 430 may establish and manage communications with base stations 105 and/or other mobile devices 115. By way of example, the communications management module 430 may be a component of the mobile device 115-d in communication with some or all of the other components of the mobile device 115-d via a bus. Alternatively, functionality of the communications management module 430 may be implemented as a component of the transceiver module 410, as a computer program product, and/or as one or more controller elements of the processor module 425.

The communications management module 430 may in some cases include a direct link management module 460. The direct link management module 460 may in some cases be used to facilitate the establishment of a direct link (e.g., a peer-to-peer link) with a mobile device 115 in need of relay services (i.e., at least one other mobile device 115). Thereafter, the mobile device 115-d may receive and retransmit at least one transmission (e.g., a data transmission) from a base station 105 to the mobile device 115 in need of relay services and/or from the mobile device 115 in need of relay services to the base station 105. Similarly, the mobile device 115-d may receive and retransmit at least one transmission (e.g., a data transmission) from a mobile device 115 in need of service to a mobile device 115 providing relay services for the mobile device 115-d, or vice versa. In some embodiments, the retransmission(s) may be made using a processor module, such as the processor module 425 described with reference to FIG. 4.

The state module 435 may reflect and control the current device state (e.g., context, authentication, base station association, other connectivity issues).

The peer discovery module 440 may identify the mobile device 115-d to other mobile devices 115. The peer discovery module 440 may also identify other mobile devices 115, such as 1) mobile devices 115 that are out of the coverage area of a base station 105, which mobile devices 115 may use the mobile device 115 as a relay device, and/or 2) in-coverage mobile devices 115 that may be capable of providing relaying services to the mobile device 115-*d* when the mobile device 115-*d* is out of the coverage area of a base station 105.

The peer discovery module 440 may include a status module 445, a multimedia broadcast multicast service (MBMS) service announcement module 450, and/or a sensing module 455. The status module 445 may determine whether the mobile device 115-*d* is capable of functioning as a relay device and providing relay services. The status module 445 may also determine when the mobile device 115-*d* transitions to (or from) a relay status. For example, the status module 445 may analyze the available power or bandwidth of the mobile device 115-*d*, whether the mobile device 115-*d* possesses LTE-Direct capabilities, etc. Upon determining that it is capable of providing relay services, the status module 445 may transition the status of the mobile device 115-*d* to a relay status. The mobile device 115-*d* may then broadcast a peer discovery signal 205 indicating a capability of the mobile device 115-*d* to function as a relay device. An out-of-coverage mobile device 115 may receive the broadcast signal and determine whether to use the mobile device 115-*d* as a relay device.

In one configuration, the MBMS service announcement module 450 may analyze service announcement information received for at least one MBMS bearer service. The module 450 may identify at least a subset of the service announcement information. The identified subset of the MBMS service announcement information may be broadcast to one or more out-of-coverage mobile devices, along with the peer discovery signal indicating the relay status. The mobile device 115-*d* may relay content of the MBMS to the one or more out-of-coverage mobile devices.

The sensing module 455 may sense when the mobile device 115-*d* is about to be out of range of a base station 105. The sensing module 455 may also determine when the mobile device 115-*d* is already out of range of a base station 105. Upon sensing that the mobile device 115-*d* is about to transition out of the coverage area (or has already transitioned out of the coverage area) of a base station 105, the mobile device 115-*d* may broadcast a peer discovery signal 205 to request relay services. One or more mobile devices that are still in the coverage area of a base station 105 may receive the broadcast and determine whether to provide the relay services.

The components of the mobile device 115-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*d*.

Figure 5:
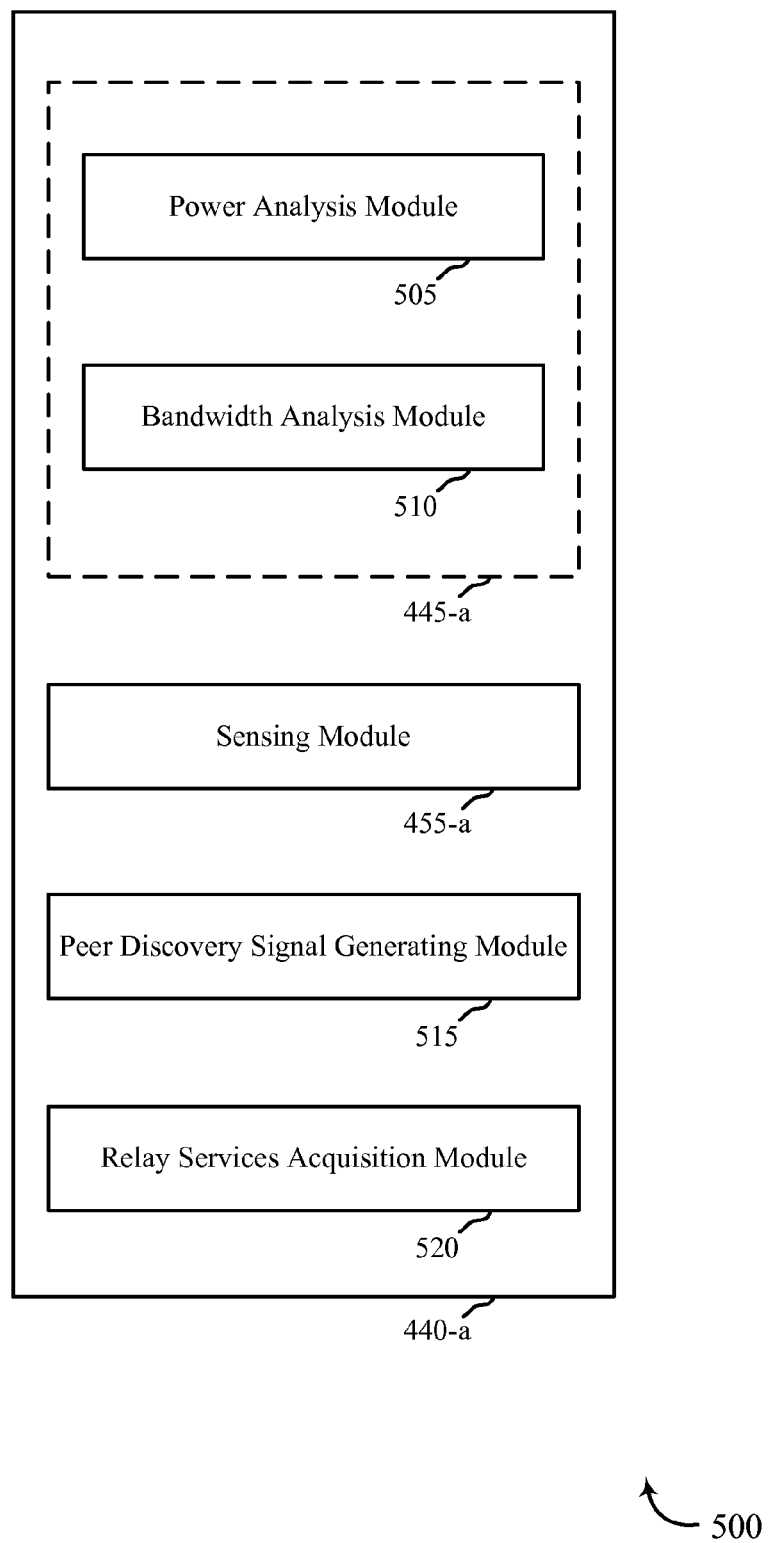
FIG. 5 is a block diagram of an example of a peer discovery module in accordance with various embodiments.

FIG. 5 is a block diagram 500 of an example of a peer discovery module 440-*a*. In some embodiments, the peer discovery module 440-*a* may be an example of one or more aspects of the peer discovery module 440 described with reference to FIG. 4. The peer discovery module 440-*a* may include a status module 445-*a*, a sensing module 455-*a*, a peer discovery signal generating module 515, and/or a relay services acquisition module 520. Each of these components may be in communication with each other. In some embodiments, the status module 445-*a* and/or sensing module 455-*a* may be examples of one or more aspects of the respective status module 445 and/or sensing module 455 described with reference to FIG. 4.

The components of the peer discovery module 440-*a* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The status module 445-*a* may determine whether a mobile device 115 is capable of functioning as a relay device and providing relay services. The status module 445-*a* may also determine when the mobile device 115 transitions to (or from) a relay status (e.g., the status module 445-*a* may cause the mobile device 115 to transition to (or from) a relay status). In some cases, the status module 445-*a* may include a power analysis module 505 for determining whether an available operating power of the mobile device 115 exceeds a threshold. In some cases, the status module 445-*a* may transition the mobile device 115 to the relay status upon determining that the available operating power of the mobile device 115 exceeds the operating power threshold. Otherwise, the mobile device 115 may be maintained in a non-relay status. In this manner, the power analysis module 505 may determine, for example, whether the mobile device 115 has sufficient operating power to provide for its own functions as well as relay services.

The status module 445-*a* may also include a bandwidth analysis module 510 for determining whether an available transmission bandwidth of the mobile device 115 exceeds a threshold. In some cases, the status module 445-*a* may transition the mobile device 115 to the relay status upon determining that the available bandwidth of the mobile device 115 exceeds the available bandwidth threshold. Otherwise, the mobile device 115 may be maintained in a non-relay status. In this manner, the bandwidth analysis module 510 may ensure, for example, that the mobile device 115 has enough bandwidth to serve its own functions as well as relay services.

The status module 445-*a* may in some cases analyze additional or alternative factors when determining its capability to provide relay services. For example, the status module 445-*a* may determine whether the mobile device 115 possesses LTE-Direct capabilities.

In some embodiments, the status module 445-*a* may determine whether to transition the mobile device 115 to a relay status periodically or upon a triggering event. In some cases, the triggering event may be a receipt, by the mobile device 115, of an out-of-coverage status indicator broadcast by another mobile device 115. Upon receiving such an out-of-coverage status indicator, the mobile device 115 may determine whether it is able to transition to a relay status and provide relay services for the mobile device that broadcast the out-of-coverage status indicator. In such a case, the status module 445-*a* may make additional determinations before transitioning to the relay status. For example, the status module may determine whether a service required by the out-of-coverage mobile device 115 is provided by a base station 105 with which the mobile device 115 is in communication.

In cases where the status module 445-*a* transitions the mobile device 115 to the relay status, the peer discovery signal generating module 515 may transmit a peer discovery signal that indicates the relay status (i.e., the capability of the mobile device 115 to function as a relay device). The peer discovery signal may be transmitted to one or more particular mobile devices 115 or broadcast to all mobile devices 115. An out-of-coverage mobile device 115 may receive the peer discovery signal and determine whether to use the mobile device 115-*d* as a relay device.

The sensing module 455-*a* may sense when the mobile device 115 is about to be out of range of a base station 105. The sensing module 455-*a* may also determine when the mobile device 115 is already out of range of a base station 105. Upon sensing that the mobile device 115 is about to transition out of the coverage area (or has already transitioned out of the coverage area) of a base station 105, the sensing module 455-*a* may cause the peer discovery signal generating module 515 to broadcast an out-of-coverage status indicator in a peer discovery signal. One or more mobile devices that are still in the coverage area of a base station 105 may receive the broadcast and determine whether to provide relay services to the mobile device 115.

The relay services acquisition module 520 may receive a peer discovery signal from each of one or more other mobile devices 115 capable of providing relay services to the mobile device 115 in which the peer discovery module 440-*a* is implemented. The relay services acquisition module 520 may then indicate to the direct link management module 460 (FIG. 4) which of the other mobile devices 115 should be used to provide relay services for the mobile device 115. In some cases, the module 520 may identify a first mobile device 115 for which a peer discovery signal is received as the mobile device 115 to provide relay services. In other cases, the module 520 may analyze one or more factors to determine whether a mobile device is acceptable to provide relay services. For example, the module 520 may determine whether a signal strength of a communication with the candidate mobile device 115 exceeds a threshold. In still other cases, the module 520 may perform a comparative analysis on candidate mobile devices 115, to determine which of the candidate mobile devices 115 is best able to provide relay services. For example, the module 520 may compare signal strengths of communications with each of the candidate mobile devices 115, to identify the best signal strength.

Figure 6:
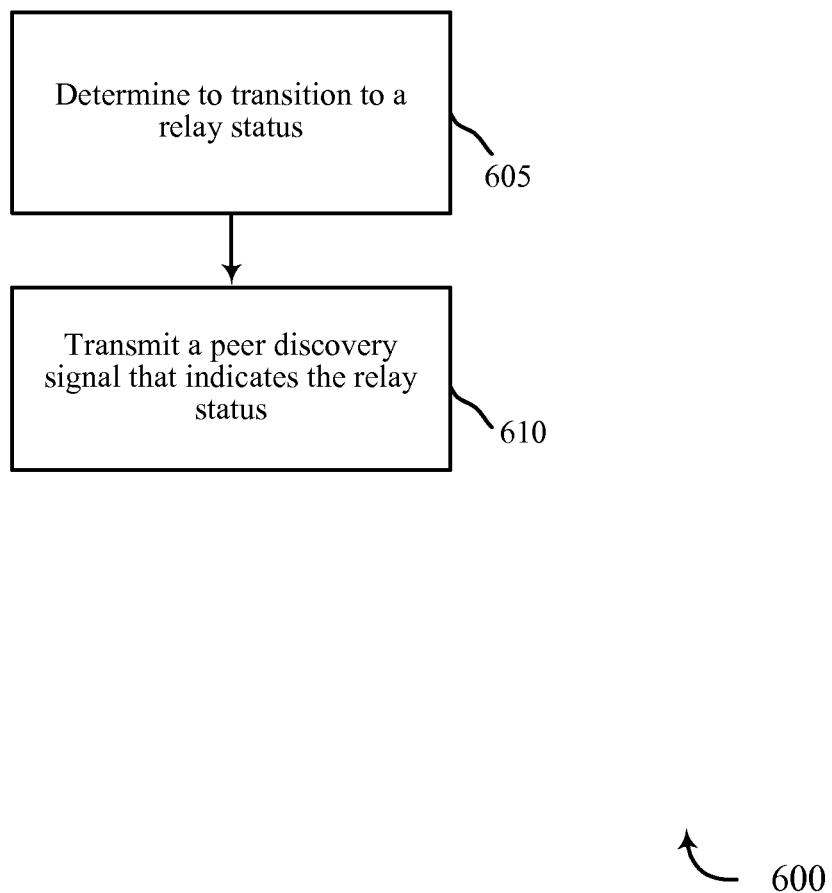
FIGS. 6-12 are flowcharts of various methods for managing wireless communications, in accordance with various embodiments.

FIG. 6 is a flow chart illustrating one embodiment of a method 600 for managing wireless communications. For clarity, the method 600 is described below with reference to aspects of one or more of the mobile devices 115 described with reference to FIGS. 1, 2, 3A, and/or 5. In some implementations, the peer discovery module 440 described with reference to FIGS. 4 and/or 5 may execute one or more sets of codes to control the functional elements of a mobile device 115 to perform the functions described below.

At block 605, a mobile device 115 may make a determination to transition to a relay status. The relay status may indicate a capability of the mobile device 115 to function as a relay device between at least one other mobile device 115 and a base station 105. In some cases, the mobile device 115 may operate in a coverage area of the base station 105, and the at least one other mobile device 115 may operate out of the coverage area of the base station 105. In some embodiments, the determination made at block 605 may be made using the peer discovery module 440 and/or status module 445 described with reference to FIGS. 4 and/or 5.

At block 610, a peer discovery signal that indicates the relay status may be transmitted. In some cases, the peer discovery signal may be broadcast to the at least one other mobile device. In other cases, the peer discovery signal may be transmitted to any one or more of the at least one other mobile device. In some embodiments, the transmission made at block 610 may be made using the peer discovery module 440 described with reference to FIGS. 4 and/or 5, and/or the peer discovery signal generating module 515 described with reference to FIG. 5.

Therefore, the method 600 may be used for managing wireless communications. It should be noted that the method 600 is just one implementation and that the operations of the method 600 may be rearranged or otherwise modified such that other implementations are possible.

Figure 7:
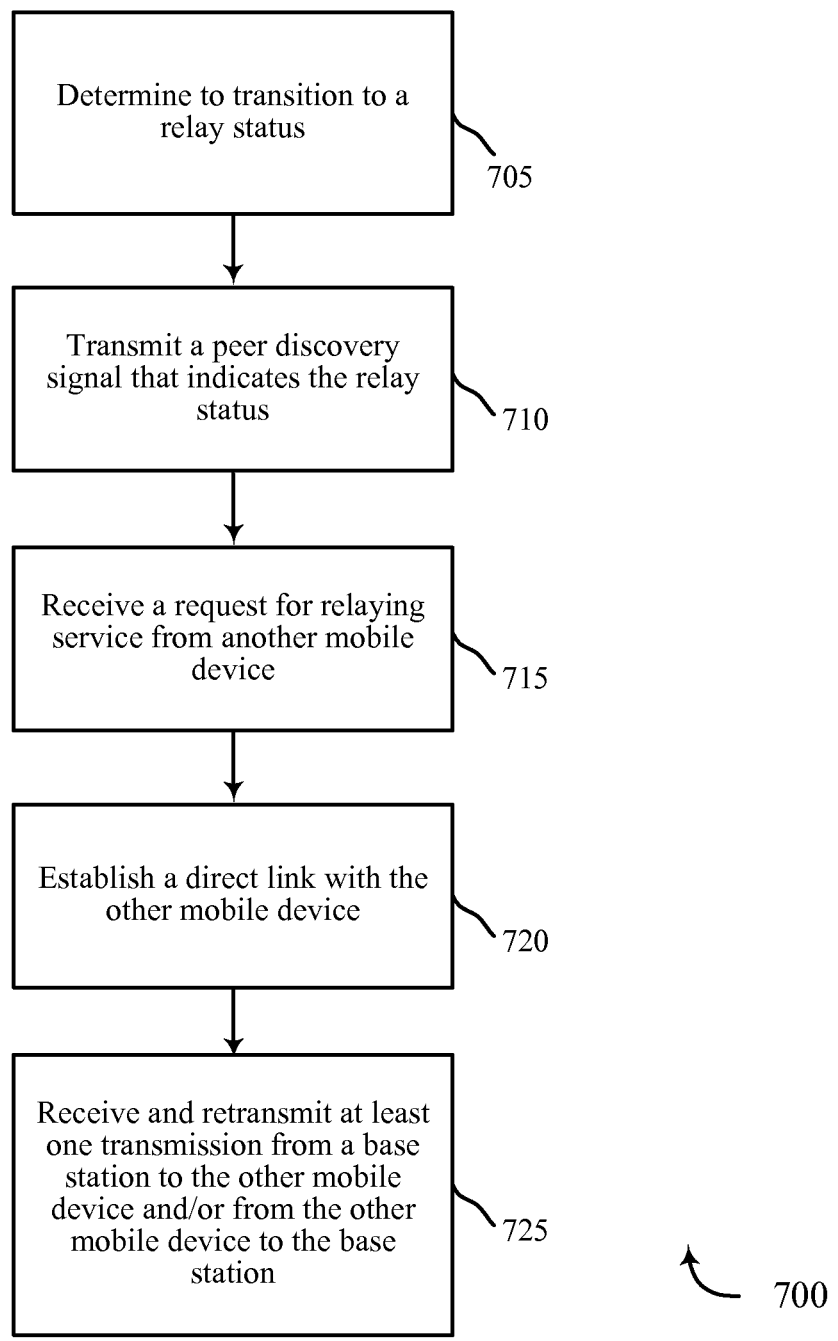

FIG. 7 is a flow chart illustrating another embodiment of a method 700 for managing wireless communications. For clarity, the method 700 is described below with reference to aspects of one or more of the mobile devices 115 described with reference to FIGS. 1, 2, 3A, and/or 5. In some implementations, the peer discovery module 440 described with reference to FIGS. 4 and/or 5 may execute one or more sets of codes to control the functional elements of a mobile device 115 to perform the functions described below.

At block 705, a mobile device 115 may make a determination to transition to a relay status. The relay status may indicate a capability of the mobile device 115 to function as a relay device between at least one other mobile device 115 and a base station 105. In some cases, the mobile device 115 may operate in a coverage area of the base station 105, and the at least one other mobile device 115 may operate out of the coverage area of the base station 105. In some embodiments, the determination made at block 705 may be made using the peer discovery module 440 and/or status module 445 described with reference to FIGS. 4 and/or 5.

At block 710, a peer discovery signal indicating the relay status may be transmitted. For example, the peer discovery signal may be broadcast to the at least one other mobile device. In some embodiments, the transmission made at block 610 may be made using the peer discovery module 440 described with reference to FIGS. 4 and/or 5, and/or the peer discovery signal generating module 515 described with reference to FIG. 5.

At block 715, a request for relaying service may be received from another mobile device 115 (e.g., from one of the at least one other mobile device 115). In some embodiments, the request may be received using the peer discovery module 440 described with reference to FIGS. 4 and/or 5.

At block 720, a direct link (e.g., a peer-to-peer link) may be established with the other mobile device 115. In some embodiments, the direct link may be established using the communications module 430 and/or the direct link management module 460 described with reference to FIG. 4.

At block 725, at least one transmission may be received and retransmitted from the base station 105 to the other mobile device 115 and/or from the other mobile device 115 to the base station 105. For example, a transmission (e.g., data) may be received from the base station 105 and retransmitted to the other mobile device 115, and/or a transmission (e.g., data) may be received from the other mobile device 115 and retransmitted to the base station 105. In some embodiments, the retransmission(s) made at block 725 may be made using the processor module 425 described with reference to FIG. 4.

In an alternate embodiment of the method 700, an out-of-coverage status indicator may be received from the other mobile device 115 prior to block 705. In this embodiment, the mobile device 115 may determine to transition to the relay status in response to receiving the out-of-coverage status indicator at block 705, and may not receive the request for relaying service from the other mobile device 115 at block 715. In some cases, the out-of-coverage status indicator may be received in a peer discovery message broadcast by the other mobile device 115.

Therefore, the method 700 may be used for managing wireless communications. It should be noted that the method 700 is just one implementation and that the operations of the method 700 may be rearranged or otherwise modified such that other implementations are possible.

Figure 8:
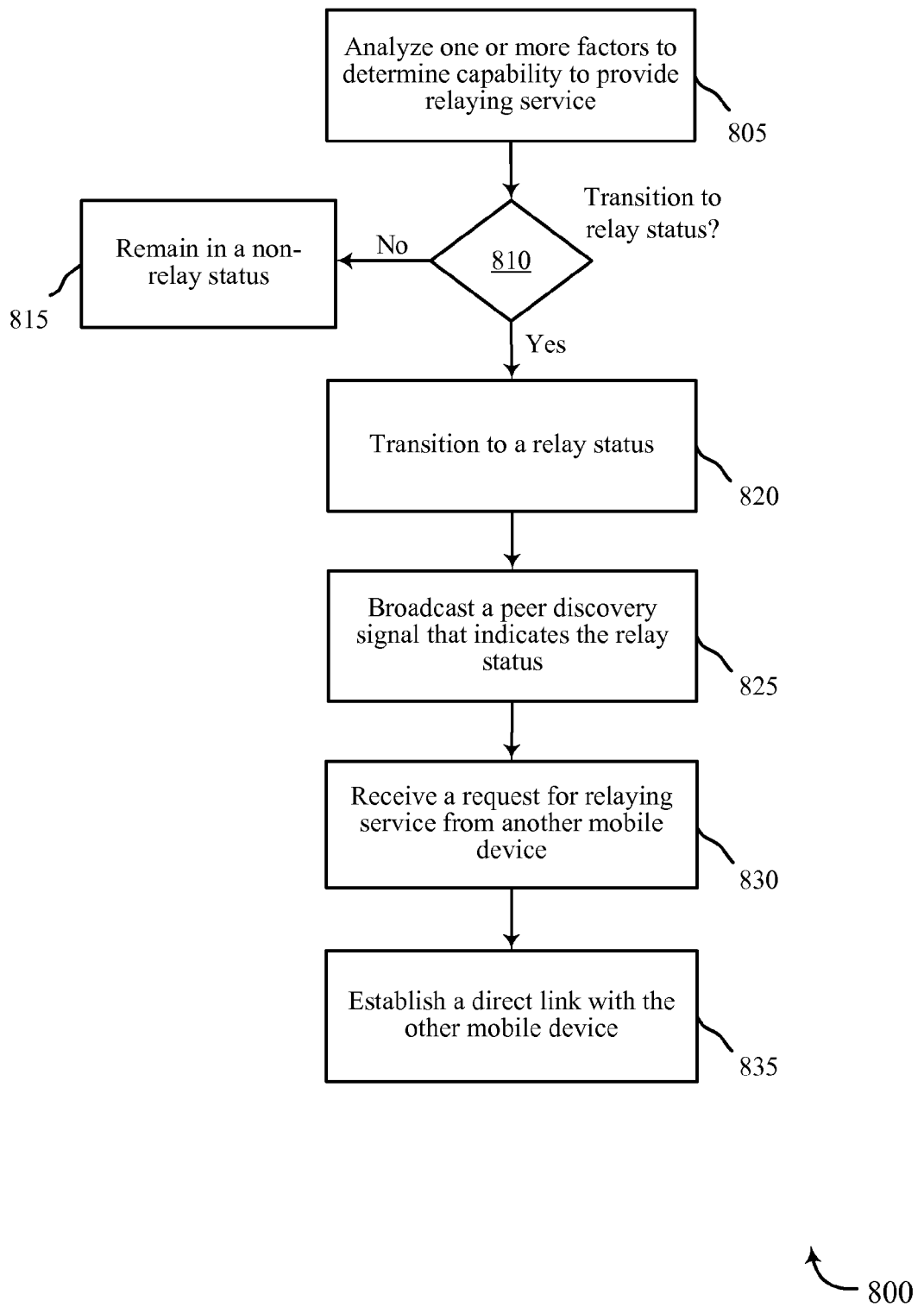

FIG. 8 is a flow chart illustrating yet another embodiment of a method 800 for managing wireless communications. For clarity, the method 800 is described below with reference to aspects of one or more of the mobile devices 115 described with reference to FIGS. 1, 2, 3A, and/or 5. In some implementations, the peer discovery module 440 described with reference to FIGS. 4 and/or 5 may execute one or more sets of codes to control the functional elements of a mobile device 115 to perform the functions described below.

At block 805, a mobile device 115 may analyze one or more factors to determine its capability to provide relaying service for at least one other mobile device 115. For example, the mobile device 115 may determine whether an available operating power of the mobile device 115 exceeds a threshold, or whether an available transmission bandwidth of the mobile device 115 exceeds a threshold.

At block 810, it may be determined whether the mobile device 115 should transition to relay status. For example, the mobile device 115 may determine to transition to relay status upon determining that the available operating power of the mobile device exceeds its corresponding threshold and/or upon determining that the available transmission bandwidth of the mobile device 115 exceeds its corresponding threshold. The relay status may indicate the capability of the mobile device 115 to function as a relay device between at least one other mobile device 115 and a base station 105.

When the mobile device 115 determines not to transition to a relay status, it may remain in a non-relay status at block 815. When the mobile device 115 determines to transition to a relay status, it may transition to the relay status at block 820.

In some embodiments, the operations at blocks 805, 810, 815, and/or 820 may be performed using the peer discovery module 440 and/or status module 445 described with reference to FIGS. 4 and/or 5.

At block 825, a peer discovery signal indicating the relay status may be broadcast to the at least one other mobile device. In some embodiments, the signal broadcast made at block 825 may be made using the peer discovery module 440 described with reference to FIGS. 4 and/or 5, and/or the peer discovery signal generating module 515 described with reference to FIG. 5.

At block 830, a request for relaying service may be received from another mobile device 115 (e.g., from one of the at least one other mobile device 115). In some cases, the mobile device 115 may operate in a coverage area of the base station 105, and the other mobile device 115 may operate out of the coverage area of the base station 105. In some embodiments, the request may be received using the peer discovery module 440 described with reference to FIGS. 4 and/or 5.

At block 835, a direct link (e.g., a peer-to-peer link) may be established with the other mobile device 115. In some embodiments, the direct link may be established using the communications management module 430 and/or the direct link management module 460 described with reference to FIGS. 4 and/or 5.

Therefore, the method 800 may be used for managing wireless communications. It should be noted that the method 800 is just one implementation and that the operations of the method 800 may be rearranged or otherwise modified such that other implementations are possible.

Figure 9:
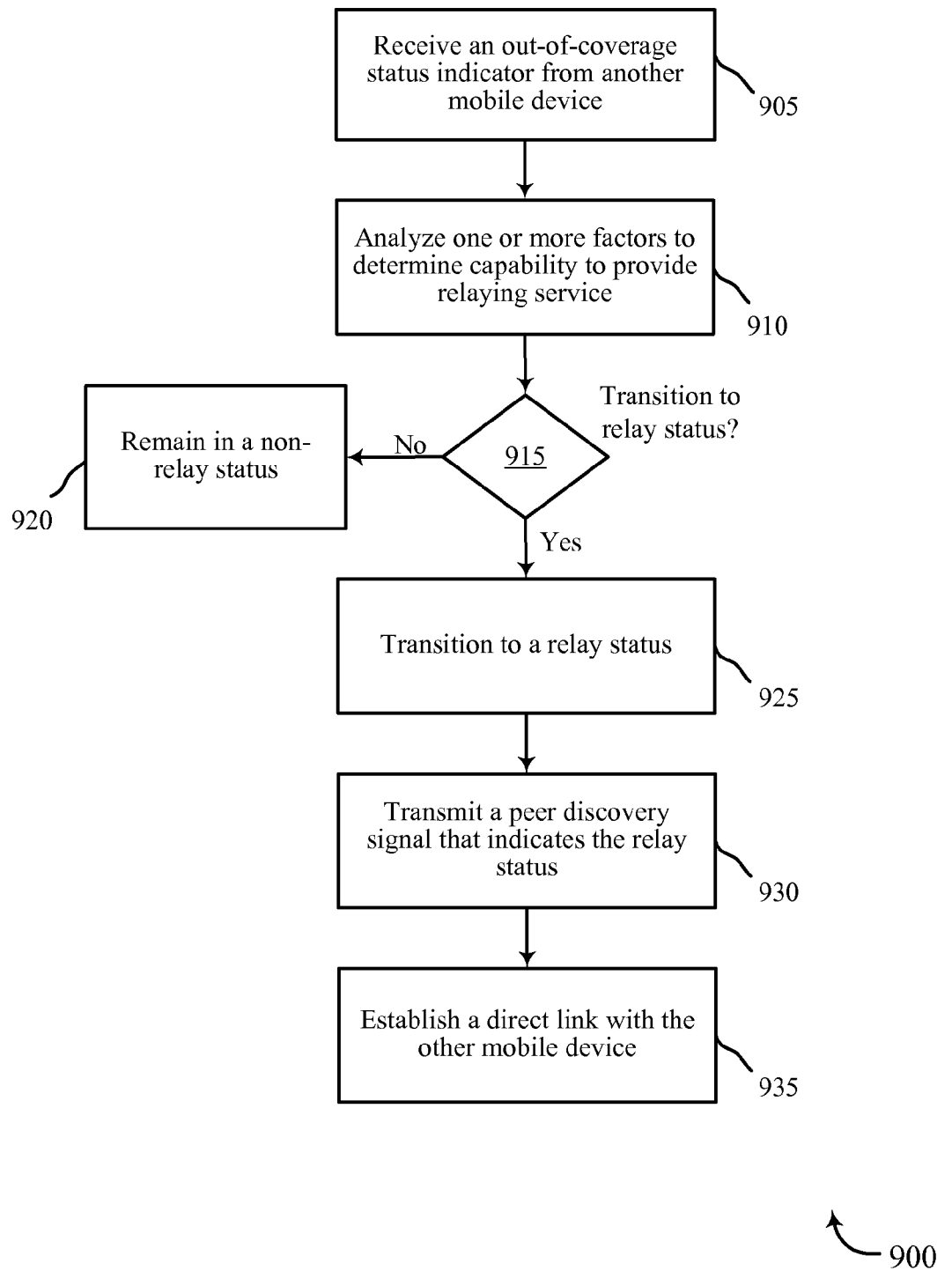

FIG. 9 is a flow chart illustrating still another embodiment of a method 900 for managing wireless communications. For clarity, the method 900 is described below with reference to aspects of one or more of the mobile devices 115 described with reference to FIGS. 1, 2, 3A, and/or 5. In some implementations, the peer discovery module 440 described with reference to FIGS. 4 and/or 5 may execute one or more sets of codes to control the functional elements of a mobile device 115 to perform the functions described below.

At block 905, a mobile device 115 may receive an out-of-coverage status indicator from another mobile device 115. The mobile device 115 may then determine whether to transition to a relay status at blocks 910 and 915, in response to receiving the out-of-coverage status indicator at block 905. The mobile device 115 may operate in a coverage area of a base station 105, and the other mobile device 115 may operate out of the coverage area of the base station 105. In some cases, the out-of-coverage status indicator may be received in a peer discovery message broadcast by the other mobile device 115. In some embodiments, the request may be received using the peer discovery module 440 described with reference to FIGS. 4 and/or 5.

At block 910, the mobile device 115 may analyze one or more factors to determine its capability to provide relaying service for the other mobile device 115. For example, the mobile device 115 may determine whether an available operating power of the mobile device 115 exceeds a threshold, or whether an available transmission bandwidth of the mobile device 115 exceeds a threshold. The mobile device 115 may also determine whether a service required by the other mobile device is provided by the base station 105 for which the mobile device 115 can provide relaying service.

At block 915, it may be determined whether the mobile device 115 should transition to relay status. For example, the mobile device 115 may determine to transition to relay status upon determining that the available operating power of the mobile device exceeds its corresponding threshold and/or upon determining that the available transmission bandwidth of the mobile device 115 exceeds its corresponding threshold and/or upon determining that the service required by the other mobile device 115 is provided by the base station 105 for which the mobile device 115 can provide relaying service. The relay status may indicate the capability of the mobile device 115 to function as a relay device between the other mobile device 115 and the base station 105.

When the mobile device 115 determines not to transition to a relay status, it may remain in a non-relay status at block 920. When the mobile device 115 determines to transition to a relay status, it may transition to the relay status at block 925.

In some embodiments, the operations at blocks 910, 915, 920, and/or 925 may be performed using the peer discovery module 440 and/or status module 445 described with reference to FIGS. 4 and/or 5.

At block 930, a peer discovery signal that indicates the relay status may be transmitted to the other mobile device 115. In some embodiments, the signal transmission made at block 930 may be made using the peer discovery module 440 described with reference to FIGS. 4 and/or 5, and/or the peer discovery signal generating module 515 described with reference to FIG. 5.

At block 935, a direct link (e.g., a peer-to-peer link) may be established with the other mobile device 115. In some embodiments, the direct link may be established using the communications management module 430 and/or the direct link management module 460 described with reference to FIG. 4.

Therefore, the method 900 may be used for managing wireless communications. It should be noted that the method 900 is just one implementation and that the operations of the method 900 may be rearranged or otherwise modified such that other implementations are possible.

Figure 10:
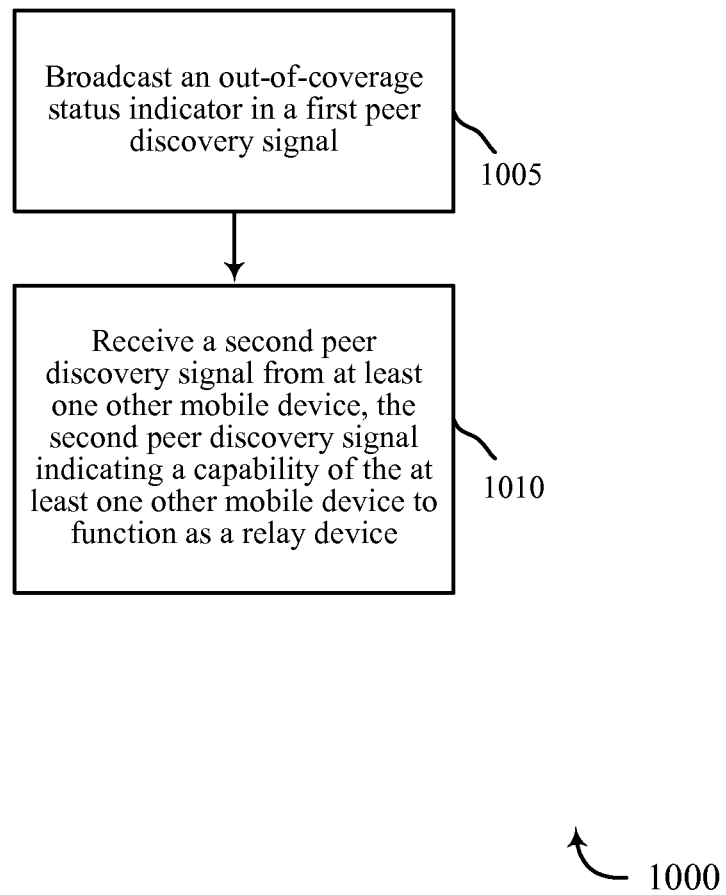

FIG. 10 is a flow chart illustrating another embodiment of a method 1000 for managing wireless communications. For clarity, the method 1000 is described below with reference to aspects of one or more of the mobile devices 115 described with reference to FIGS. 1, 2, 3B, and/or 5. In some implementations, the peer discovery module 440 described with reference to FIGS. 4 and/or 5 may execute one or more sets of codes to control the functional elements of a mobile device 115 to perform the functions described below.

At block 1005, a mobile device 115 may broadcast an out-of-coverage status indicator in a first peer discovery signal. The out-of-coverage status indicator may indicate a need of the mobile device 115 for relay service to a base station 105. In some embodiments, the signal broadcast made at block 1005 may be made using the peer discovery module 440 described with reference to FIGS. 4 and/or 5, and/or the peer discovery signal generating module 515 described with reference to FIG. 5.

At block 1010, a second peer discovery signal may be received from at least one other mobile device 115. The second peer discovery signal may indicate a capability of the at least one other mobile device 115 to function as a relay device (e.g., a peer discovery signal may be received from each of the at least one other mobile device 115 and each peer discovery signal may indicate whether a respective one of the at least one other mobile device 115 is capable of functioning as a relay device).

In some cases, the mobile device 115 may operate out of a coverage area of a base station 105, and the at least one other mobile device 115 may operate within the coverage area of the base station 105. Alternately, one or more of the other mobile devices 115 may be serving as relay devices for their respective base station(s) 105.

In some embodiments, the operations at block 1010 may be performed using the peer discovery module 440 described with reference to FIGS. 4 and/or 5, and/or the relay services acquisition module 520 described with reference to FIG. 5.

Therefore, the method 1000 may be used for managing wireless communications. It should be noted that the method 1000 is just one implementation and that the operations of the method 1000 may be rearranged or otherwise modified such that other implementations are possible.

Figure 11:
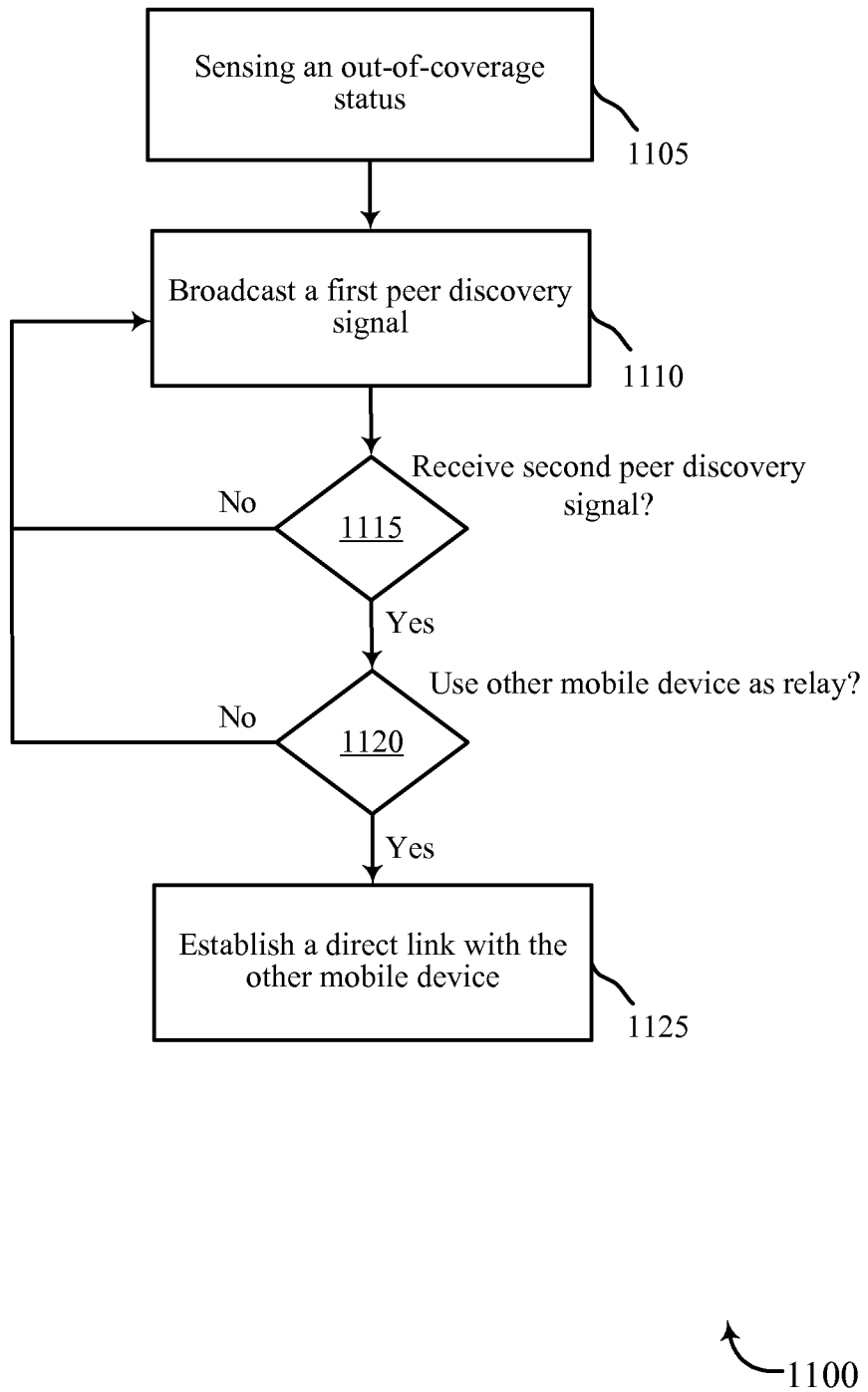

FIG. 11 is a flow chart illustrating another embodiment of a method 1100 for managing wireless communications. For clarity, the method 1100 is described below with reference to aspects of one or more of the mobile devices 115 described with reference to FIGS. 1, 2, 3B, and/or 5. In some implementations, the peer discovery module 440 described with reference to FIGS. 4 and/or 5 may execute one or more sets of codes to control the functional elements of a mobile device 115 to perform the functions described below.

At block 1105, a mobile device 115 may sense an out-of-coverage status. In some cases, the out-of-coverage status may be sensed upon (or subsequent to) operating outside of a coverage area of a base station 105. In other cases, the out-of-coverage status may be sensed prior to operating outside of the coverage area of the base station 105 (e.g., the mobile device 115 may determine based on failing signal strength and/or other factors that it is exiting the coverage area of the base station 105). In some embodiments, the out-of-coverage status may be sensed using the peer discovery module 440 and/or the sensing module 455, as described with reference to FIGS. 4 and/or 5.

At block 1110, the mobile device 115 may broadcast an out-of-coverage status indicator in a first peer discovery signal. The out-of-coverage status indicator may indicate a need of the mobile device 115 for relay service to a base station 105. In some embodiments, the signal broadcast made at block 1110 may be made using the peer discovery module 440 described with reference to FIGS. 4 and/or 5, and/or the peer discovery signal generating module 515 described with reference to FIG. 5.

At block 1115, it may be determined whether a second peer discovery signal has been received from at least one other mobile device 115. The second peer discovery signal may indicate a capability of the at least one other mobile device 115 to function as a relay device (e.g., a peer discovery signal may be received from each of the at least one other mobile device 115 and each peer discovery signal may indicate whether a respective one of the at least one other mobile device 115 is capable of functioning as a relay device). When the second peer discovery signal has been received, operation of the method 1100 may continue to block 1120. Otherwise, operation of the method 1100 may return, for example, to block 1110.

In some cases, the mobile device 115 may operate out of a coverage area of a base station 105, and the at least one other mobile device 115 may operate within the coverage area of the base station 105. Alternately, one or more of the other mobile devices 115 may be serving as relay devices for their respective base station(s) 105.

In some embodiments, the operations at block 1115 may be performed using the peer discovery module 440 described with reference to FIGS. 4 and/or 5, and/or the relay services acquisition module 520 described with reference to FIG. 5.

At block 1120, it may be determined whether to use another mobile device 115 (e.g., one of the at least one other mobile device 115) as a relay. In some cases, it may be determined to use another mobile device 115 as a relay because the mobile device 115 received a peer discovery signal indicating a capability of the other mobile device 115 to function as a relay. In other cases, it may be determined to use the other mobile device 115 as a relay based on an analysis of one or more additional factors. For example, it may be determined whether a signal strength of a communication with the other mobile device 115 exceeds a threshold.

When the second peer discovery signal is received from the other mobile device 115 and/or the signal strength of the communication with the other mobile device 115 exceeds the threshold, a direct link (e.g., a peer-to-peer link) may be established with the other mobile device 115 at block 1125. In some embodiments, the direct link may be established using the communications management module 430 and/or the direct link management module 460 described with reference to FIG. 4. When the signal strength of the communication with the other mobile device 115 does not exceed the threshold, operation of the method 1100 may return, for example, to block 1110.

In some embodiments of the method 1100, one or more factors may be analyzed for each of a number of other mobile devices 115 that are capable of functioning as relay devices. For example, it may be determined whether a signal strength of a communication with each of at least one other mobile device 115 exceeds a threshold, and a direct link may be established with one of the at least one other mobile device 115 upon determining that the signal strength of the communication with the one of the at least one other mobile device 115 exceeds the threshold. In some cases, the one of the at least one other mobile device 115 may be selected based on a determination that the communication with the one other mobile device 115 was associated with the best signal strength. The one of the at least one other mobile device 115 may also be selected based on alternate and/or additional factors.

Therefore, the method 1100 may be used for managing wireless communications. It should be noted that the method 1100 is just one implementation and that the operations of the method 1100 may be rearranged or otherwise modified such that other implementations are possible.

Figure 12:
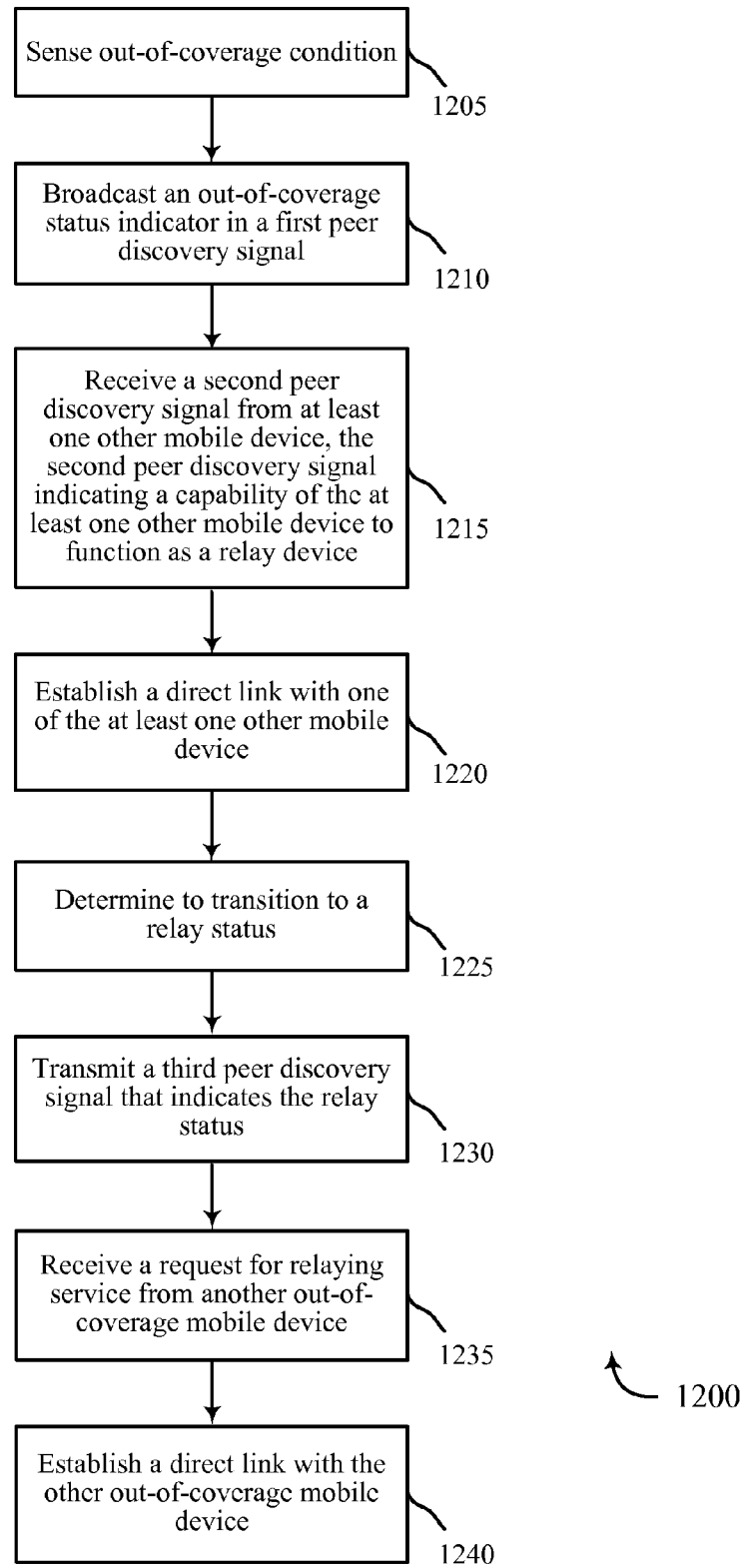

FIG. 12 is a flow chart illustrating another embodiment of a method 1200 for managing wireless communications. For clarity, the method 1200 is described below with reference to aspects of one or more of the mobile devices 115 described with reference to FIGS. 1, 2, 3B, and/or 5. In some implementations, the peer discovery module 440 described with reference to FIGS. 4 and/or 5 may execute one or more sets of codes to control the functional elements of a mobile device 115 to perform the functions described below.

At block 1205, a mobile device 115 may sense that it is out of range of a base station 105 (or about to be out of range of the base station 105). In some embodiments, the sensing performed at block 1205 may be accomplished using the peer discovery module 440 and/or the sensing module 455 described with reference to FIGS. 4 and/or 5.

At block 1210, the out-of-coverage mobile device 115 may broadcast an out-of-coverage status indicator in a first peer discovery signal. The out-of-coverage status indicator may indicate a need of the mobile device 115 for relay service to a base station 105. In some embodiments, the signal broadcast made at block 1210 may be made using the peer discovery module 440 described with reference to FIGS. 4 and/or 5, and/or the peer discovery signal generating module 515 described with reference to FIG. 5.

At block 1215, a second peer discovery signal may be received from at least one other mobile device 115. The second peer discovery signal may indicate a capability of the at least one other mobile device 115 to function as a relay device (e.g., a peer discovery signal may be received from each of the at least one other mobile device 115 and each peer discovery signal may indicate whether a respective one of the at least one other mobile device 115 is capable of functioning as a relay device).

In some cases, the mobile device 115 may operate out of a coverage area of a base station 105, and the at least one other mobile device 115 may operate within the coverage area of the base station 105. Alternately, one or more of the other mobile devices 115 may be serving as relay devices for their respective base station(s) 105.

In some embodiments, the operations at block 1215 may be performed using the peer discovery module 440 described with reference to FIGS. 4 and/or 5, and/or the relay services acquisition module 520 described with reference to FIG. 5.

At block 1220, a direct link (e.g., a peer-to-peer link) may be established with one of the at least one other mobile device 115. In some embodiments, the direct link may be established using the communications management module 430 and/or the direct link management module 460 described with reference to FIG. 4.

At block 1225, the mobile device 115 may itself make a determination to transition to a relay status. The relay status of the mobile device 115 may indicate a capability of the mobile device 115 to function as a relay device between the in-coverage mobile device 115 from which it receives relay service and at least one other out-of-coverage mobile device that needs relay service for communicating with the base station 105. Thus, the mobile device 115 may both 1) use the relay service provided by an in-coverage mobile device, and 2) provide relay service to one or more other out-of-coverage mobile devices. In some embodiments, the determination made at block 1225 may be made using the peer discovery module 440 and/or status module 445 described with reference to FIGS. 4 and/or 5.

At block 1230, a third peer discovery signal that indicates the relay status may be transmitted. For example, the third peer discovery signal may be broadcast to the at least one out-of-coverage mobile device 115. In some embodiments, the transmission made at block 610 may be made using the peer discovery module 440 described with reference to FIGS. 4 and/or 5, and/or the peer discovery signal generating module 515 described with reference to FIG. 5.

At block 1235, a request for relaying service may be received from an out-of-coverage mobile device 115 (e.g., from one of the at least one out-of-coverage mobile device 115). In some embodiments, the request may be received using the peer discovery module 440 and/or sensing module 455 described with reference to FIGS. 4 and/or 5.

At block 1240, a direct link (e.g., a peer-to-peer link) may be established with the out-of-coverage mobile device 115. In some embodiments, the direct link may be established using the peer discovery module 440 described with reference to FIGS. 4 and/or 5, and/or the direct link generating module 525 described with reference to FIG. 5.

By means of the mobile device 115 performing the method 1200, at least one transmission may be received and retransmitted from the one of the at least one other mobile device 115 to the out-of coverage mobile device 115 and/or from the out-of-coverage mobile device 115 to the one of the at least one other mobile device 115. For example, a transmission (e.g., data) may be received from a mobile device 115 closer to a base station 105 and retransmitted to an out-of-coverage mobile device 115, and/or a transmission (e.g., data) may be received from the out-of coverage mobile device 115 and retransmitted to the mobile device 115 closer to the base station 105. In some embodiments, the retransmission(s) may be made using the processor module 425 described with reference to FIG. 4.

In an alternate embodiment of the method 1200, an out-of-coverage status indicator may be received from the out-of-coverage mobile device 115 prior to block 1225. In this embodiment, the mobile device 115 may determine to transition to the relay status in response to receiving the out-of-coverage status indicator at block 1225, and may not receive the request for relaying service from the out-of-coverage mobile device 115 at block 1235. In some cases, the out-of-coverage status indicator may be received in a peer discovery message broadcast by the out-of-coverage mobile device 115.

Therefore, the method 1200 may be used for managing wireless communications. It should be noted that the method 1200 is just one implementation and that the operations of the method 1200 may be rearranged or otherwise modified such that other implementations are possible. The method 1200 may be useful, in some cases, in that it can facilitate multi-hop relay services.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing wireless communications, comprising:
   receiving, by an in-coverage mobile device, a peer discovery message from an out-of-coverage mobile device, the in-coverage mobile device being a mobile device within coverage of a base station, the out-of-coverage mobile device being a mobile device out of coverage or anticipated to be out of coverage of the base station, and the peer discovery message comprising an indication of a type of service or type of relay service required by the out-of-coverage mobile device;
   determining, by the in-coverage mobile device in response to the peer discovery message, to transition to a relay status, the relay status indicating a capability of the in-coverage mobile device to function as a relay device between the base station in communication with the in-coverage mobile device and the out-of-coverage mobile device; and
   transmitting, by the in-coverage mobile device, a relay capability signal to the out-of-coverage mobile device based at least in part on the peer discovery message from the out-of-coverage mobile device and the transition to relay status, the relay capability signal indicating the relay status of the in-coverage mobile device.

2. The method of claim 1, further comprising:
   determining that an available operating power of the in-coverage mobile device exceeds a threshold; and
   determining to transition to the relay status based at least in part on the determining that the available operating power of the in-coverage mobile device exceeds the threshold.

3. The method of claim 1, further comprising:
   determining that an available transmission bandwidth of the in-coverage mobile device exceeds a threshold; and
   determining to transition to the relay status based at least in part on the determining that the available transmission bandwidth of the in-coverage mobile device exceeds the threshold.

4. The method of claim 1, further comprising:
   establishing a direct link with the out-of-coverage mobile device.

5. The method of claim 1, further comprising:
   determining, by the in-coverage mobile device, that the type of service required by the out-of-coverage mobile device is provided by the base station or that the type of relay service is supported by the in-coverage mobile device; and
   establishing a direct link with the out-of-coverage mobile device based at least in part on the determining that the type of service required by the out-of-coverage mobile device is provided by the base station or that the type of relay service is supported by the in-coverage mobile device.

6. The method of claim 1, further comprising:
   receiving a transmission from the base station; and
   retransmitting the transmission to the out-of-coverage mobile device.

7. The method of claim 1, further comprising:
   receiving a transmission from the out-of-coverage mobile device; and
   retransmitting the transmission to the base station.

8. The method of claim 1, further comprising:
   receiving data from the base station; and
   retransmitting the data to the out-of-coverage mobile device.

9. The method of claim 1, further comprising:
   determining that the in-coverage mobile device is in a coverage area of the base station; and
   communicating, by the in-coverage mobile device, directly with the base station.

10. The method of claim 1, further comprising:
    determining that the out-of-coverage mobile device is out of coverage from the base station; and
    communicating, by the in-coverage mobile device, with the out-of-coverage mobile device such that the out-of-coverage mobile device indirectly communicates with the base station.

11. A mobile device for managing wireless communications, the mobile device in coverage of a base station and comprising:
    mean for receiving a peer discovery message from an out-of-coverage mobile device, the out-of-coverage mobile device being a mobile device out of coverage or anticipated to be out of coverage of the base station and the peer discovery message comprising an indication of a type of service or type of relay service required by the out-of-coverage mobile device;
    means for determining to transition to a relay status in response to the peer discovery message, the relay status indicating a capability of the in-coverage mobile device to function as a relay device between the base station in communication with the in-coverage mobile device and the out-of-coverage mobile device; and
    means for transmitting a relay capability signal to the out-of-coverage mobile device based at least in part on the peer discovery message from the out-of-coverage mobile device and the transition to relay status, the relay capability signal indicating the relay status of the in-coverage mobile device.

12. The in-coverage mobile device of claim 11, further comprising:
    means for determining that an available operating power of the in-coverage mobile device exceeds a threshold; and
    means for determining to transition to the relay status based at least in part on the determining that the available operating power of the in-coverage mobile device exceeds the threshold.

13. The in-coverage mobile device of claim 11, further comprising:
means for determining that an available transmission bandwidth of the in-coverage mobile device exceeds a threshold; and
means for determining to transition to the relay status based at least in part on the determining that the available transmission bandwidth of the in-coverage mobile device exceeds the threshold.

14. The in-coverage mobile device of claim 11, further comprising:
means for establishing a direct link with the out-of-coverage mobile device.

15. The in-coverage mobile device of claim 11, further comprising:
means for determining, by the in-coverage mobile device, that the type of service required by the out-of-coverage mobile device is provided by the base station or that the type of relay service is supported by the in-coverage mobile device; and
means for establishing a direct link with the out-of-coverage mobile device based at least in part on the determining that the type of service required by the out-of-coverage mobile device is provided by the base station or that the type of relay service is supported by the in-coverage mobile device.

16. The in-coverage mobile device of claim 11, further comprising:
means for receiving a transmission from the base station; and
means for retransmitting the transmission to the out-of-coverage mobile device.

17. The in-coverage mobile device of claim 11, further comprising:
means for receiving a transmission from the out-of-coverage mobile device; and
means for retransmitting the transmission to the base station.

18. The in-coverage mobile device of claim 11, further comprising:
means for receiving data from the base station; and
means for retransmitting the data to the out-of-coverage mobile device.

19. The in-coverage mobile device of claim 11, further comprising:
means for determining that the in-coverage mobile device is in a coverage area of the base station; and
means for communicating, by the in-coverage mobile device, directly with the base station.

20. The in-coverage mobile device of claim 11, further comprising:
means for determining that the out-of-coverage mobile device is out of coverage from the base station; and
means for communicating with the out-of-coverage mobile device such that the out-of-coverage mobile device indirectly communicates with the base station.

21. A mobile device for managing wireless communications, comprising:
a processor;
memory in electronic communication with the processor; and
instructions stored in the memory, the instructions being executable by the processor to:
receive, while in coverage of a base station, a peer discovery message from an out-of-coverage mobile device, the out-of-coverage mobile device being a mobile device out of coverage or anticipated to be out of coverage of the base station and the peer discovery message comprising an indication of a type of service or type of relay service required by the out-of-coverage mobile device;
determine to transition to a relay status in response to the peer discovery message, the relay status indicating a capability of the in-coverage mobile device to function as a relay device between the base station in communication with the in-coverage mobile device and the out-of-coverage mobile device; and
transmit a relay capability signal to the out-of-coverage mobile device based at least in part on the peer discovery message from the out-of-coverage mobile device and the transition to relay status, the relay capability signal indicating the relay status of the in-coverage mobile device.

22. The in-coverage mobile device of claim 21, wherein the instructions are executable by the processor to:
determine that an available operating power of the in-coverage mobile device exceeds a threshold; and
determine to transition to the relay status based at least in part on the determining that the available operating power of the in-coverage mobile device exceeds the threshold.

23. The in-coverage mobile device of claim 21, wherein the instructions are executable by the processor to:
determine that an available transmission bandwidth of the in-coverage mobile device exceeds a threshold; and
determine to transition to the relay status based at least in part on the determining that the available transmission bandwidth of the in-coverage mobile device exceeds the threshold.

24. The in-coverage mobile device of claim 21, wherein the instructions are executable by the processor to:
establish a direct link with the out-of-coverage mobile device.

25. The in-coverage mobile device of claim 21, wherein the instructions are executable by the processor to:
determine that the type of service required by the out-of-coverage mobile device is provided by the base station or that the type of relay service is supported by the in-coverage mobile device; and
establish a direct link with the out-of-coverage mobile device based at least in part on the determining that the type of service required by the out-of-coverage mobile device is provided by the base station or that the type of relay service is supported by the in-coverage mobile device.

26. The in-coverage mobile device of claim 21, wherein the instructions are executable by the processor to:
receive data from the base station; and
retransmit the data to the out-of-coverage mobile device.

27. The in-coverage mobile device of claim 21, wherein the instructions are executable by the processor to:
determine that the in-coverage mobile device is in a coverage area of the base station; and
communicate directly with the base station.

28. The in-coverage mobile device of claim 21, wherein the instructions are executable by the processor to:
determine that the out-of-coverage mobile device is out of coverage from the base station; and
communicate with the out-of-coverage mobile device such that the out-of-coverage mobile device indirectly communicates with the base station.

29. A computer program product for managing wireless communications, the computer program product comprising a non-transitory computer-readable medium storing instructions executable by a processor to:
- receive, by a mobile device in coverage of a base station, a peer discovery message from an out-of-coverage mobile device, the out-of-coverage mobile device being a mobile device out of coverage or anticipated to be out of coverage of the base station and the peer discovery message comprising an indication of a type of service or type of relay service required by the out-of-coverage mobile device;
- determine, by the in-coverage mobile device in response to the peer discovery message, to transition to a relay status, the relay status indicating a capability of the in-coverage mobile device to function as a relay device between the base station in communication with the in-coverage mobile device and the out-of-coverage mobile device;
and
- transmit, by the in-coverage mobile device, a relay capability signal to the out-of-coverage mobile device based at least in part on the peer discovery message from the out-of-coverage mobile device and the transition to relay status, the relay capability signal indicating the relay status of the in-coverage mobile device.

30. The computer program product of claim 29, wherein the instructions are executable by the processor to:
- determine that an available operating power of the in-coverage mobile device exceeds a threshold; and
- determine to transition to the relay status based at least in part on the determining that the available operating power of the in-coverage mobile device exceeds the threshold.

31. The computer program product of claim 29, wherein the instructions are executable by the processor to:
- determine that an available transmission bandwidth of the in-coverage mobile device exceeds a threshold; and
- determine to transition to the relay status based at least in part on the determining that the available transmission bandwidth of the in-coverage mobile device exceeds the threshold.

32. The computer program product of claim 29, wherein the instructions are executable by the processor to:
- establish a direct link with the out-of-coverage mobile device.

33. The computer program product of claim 29, wherein the instructions are executable by the processor to:
- determine that the out-of-coverage mobile device is out of coverage from the base station; and
- communicate with the out-of-coverage mobile device such that the out-of-coverage mobile device indirectly communicates with the base station.

34. A method for managing wireless communications, comprising:
- transmitting, by an out-of-coverage mobile device, a peer discovery message comprising an indication of a type of service or type of relay service required by the out-of-coverage mobile device, wherein the out-of-coverage mobile device is out of coverage or anticipates a transition to being out of coverage with respect to a base station;
- receiving, by the out-of-coverage mobile device in response to the peer discovery message, a relay capability message from a mobile device in coverage of the base station, the relay capability message comprising a relay status indicating a capability of the in-coverage mobile device to function as a relay device between the out-of-coverage mobile device and the base station; and
- determining whether to use the in-coverage mobile device as a relay device for communication between the out-of-coverage mobile device and the base station based on the relay capability message.

35. The method of claim 34, wherein the determination is based on a remaining battery life of the in-coverage mobile device.

36. The method of claim 34, wherein the peer discovery message is a broadcast signal and the relay capability message is a unicast signal.

37. An apparatus for managing wireless communications at a mobile device, comprising:
- means for transmitting a peer discovery message comprising an indication of a type of service or type of relay service required by the mobile device in an out-of-coverage state, wherein the out-of-coverage state corresponds to the mobile device being out-of-coverage or anticipating a transition to being out-of-coverage with respect to a base station;
- means for receiving, in response to the peer discovery message, a relay capability message from a mobile device in coverage of the base station, the relay capability message comprising a relay status indicating a capability of the in-coverage mobile device to function as a relay device between the out-of-coverage mobile device and the base station; and
- means for determining whether to use the in-coverage mobile device as a relay device for communication between the out-of-coverage mobile device and the base station based on the relay capability message.

38. The out-of-coverage mobile device of claim 37, wherein the determination is based on a remaining battery life of the in-coverage mobile device.

39. The out-of-coverage mobile device of claim 37, wherein the peer discovery message is a broadcast signal and the relay capability message is a unicast signal.

40. An apparatus for managing wireless communications at a mobile device, comprising:
- a processor;
- memory in electronic communication with the processor; and
- instructions stored in the memory, the instructions being executable by the processor to:
- transmit a peer discovery message comprising an indication of a type of service or type of relay service required by the mobile device while in an out-of-coverage state, wherein the out-of-coverage mobile device is out-of-coverage or anticipates a transition to being out-of-coverage with respect to a base station;
- receive, by the out-of-coverage mobile device in response to the peer discovery message, a relay capability message from a mobile device in coverage of the base station, the relay capability message comprising a relay status indicating a capability of the in-coverage mobile device to function as a relay device between the out-of-coverage mobile device and the base station; and
- determine whether to use the in-coverage mobile device as a relay device for communication between the out-of-coverage mobile device and the base station based on the relay capability message.

41. The out-of-coverage mobile device of claim 40, wherein the determination is based on a remaining battery life of the in-coverage mobile device.

42. The out-of-coverage mobile device of claim 40, wherein the peer discovery message is a broadcast signal and the relay capability message is a unicast signal.

43. A computer program product for managing wireless communications at a mobile device, the computer program product comprising a non-transitory computer-readable medium storing instructions executable by a processor to:
- transmit a peer discovery message comprising an indication of a type of service or type of relay service required by the mobile device while in an out-of-coverage state, wherein the out-of-coverage state corresponds to the mobile device being out-of-coverage or anticipating a transition to being out-of-coverage with respect to a base station;
- receive, by the out-of-coverage mobile device in response to the peer discovery message, a relay capability message from a mobile device in coverage of the base station, the relay capability message comprising a relay status indicating a capability of the in-coverage mobile device to function as a relay device between the out-of-coverage mobile device and the base station in communication with the in-coverage mobile device; and
- determine whether to use the in-coverage mobile device as a relay device for communication between the out-of-coverage mobile device and the base station based on the relay capability message.

44. The computer program product of claim 43, wherein the determination is based on a remaining battery life of the in-coverage mobile device.

45. The computer program product of claim 43, wherein the peer discovery message is a broadcast signal and the relay capability message is a unicast signal.

* * * * *